(12) United States Patent
Wilkinson

(10) Patent No.: US 7,176,924 B2
(45) Date of Patent: *Feb. 13, 2007

(54) COMPUTER METHOD AND APPARATUS FOR CREATING VISIBLE GRAPHICS BY USING A GRAPH ALGEBRA

(75) Inventor: Leland Wilkinson, Chicago, IL (US)

(73) Assignee: SPSS, Inc., Chicago, IL (US)

( * ) Notice: Subject to any disclaimer, the term of this patent is extended or adjusted under 35 U.S.C. 154(b) by 3 days.

This patent is subject to a terminal disclaimer.

(21) Appl. No.: 11/257,320

(22) Filed: Oct. 24, 2005

(65) Prior Publication Data

US 2006/0033738 A1    Feb. 16, 2006

Related U.S. Application Data

(63) Continuation of application No. 10/114,755, filed on Apr. 2, 2002, now Pat. No. 7,023,453, which is a continuation of application No. 09/553,507, filed on Apr. 20, 2000, now Pat. No. 6,492,989.

(60) Provisional application No. 60/130,234, filed on Apr. 21, 1999.

(51) Int. Cl.
*G06F 15/00* (2006.01)
*G06F 7/00* (2006.01)
*G06F 7/38* (2006.01)
*G06J 1/00* (2006.01)
*G06F 7/48* (2006.01)

(52) U.S. Cl. ............... 345/440; 345/643; 345/468; 345/586; 708/206; 708/490

(58) Field of Classification Search ........ 345/440–441, 345/418–421, 619, 643–644, 721–722, 468–469, 345/586–587, 673–674; 708/1, 3, 5, 206, 708/200, 306, 320, 503–505, 626
See application file for complete search history.

(56) References Cited

U.S. PATENT DOCUMENTS 4,953,106 A    8/1990    Gansner et al.

(Continued)

OTHER PUBLICATIONS

Wilkinson, Leland, "A Graph Algebra", Proceedings of 28th Symposium on the Interface of Computing Science and Statistics, vol. 28, Jul. 8-12, 1996, pp. 341-351, XP000933829.

(Continued)

*Primary Examiner*—Wesner Sajous
(74) *Attorney, Agent, or Firm*—Ryndak & Suri LLP

(57) ABSTRACT

A computer method, apparatus and storage medium is provided for creating quantitative aesthetic graphics from data. The invention utilizes a graph algebra to construct graphs and visually or otherwise represents the graphs as a quantitative aesthetic graphic representation. To create the quantitative aesthetic graphics from data, the data is indexed to form a data set. Thereafter, the data is converted into a variable data structure composed of an index set, a range and a function. The variable data structure is converted into a variable set by using at least one of a blend step, a cross step and a nest step. The variable set is mapped into a set of points and the set of points is mapped into an aesthetic representation.

21 Claims, 18 Drawing Sheets

U.S. PATENT DOCUMENTS

| | | | |
|---|---|---|---|
| 5,179,643 A | 1/1993 | Homma et al. | |
| 5,235,506 A | 8/1993 | O'Brien, Jr. | |
| 5,402,335 A | 3/1995 | O'Brien | |
| 5,450,535 A | 9/1995 | North | |
| 5,452,410 A | 9/1995 | Magidson | |
| 5,574,837 A | 11/1996 | Clark et al. | |
| 5,592,599 A | 1/1997 | Lindholm | |
| 5,649,085 A | 7/1997 | Lehr | |
| 5,651,105 A | 7/1997 | Williman | |
| 5,666,477 A | 9/1997 | Maeda | |
| 5,680,560 A | 10/1997 | Gaertner | |
| 5,724,496 A | 3/1998 | Givens et al. | |
| 5,739,823 A | 4/1998 | Akaza et al. | |
| 5,739,824 A | 4/1998 | Dietrich et al. | |
| 5,742,738 A | 4/1998 | Koza | |
| 5,748,192 A | 5/1998 | Lindholm | |
| 5,751,294 A | 5/1998 | O'Brien, Jr. | |
| 5,758,035 A | 5/1998 | Tsuneyoshi | |
| 5,764,239 A | 6/1998 | Misue et al. | |
| 5,764,872 A | 6/1998 | Koyamada et al. | |
| 5,774,128 A | 6/1998 | Golshani et al. | |
| 5,917,500 A * | 6/1999 | Johnson et al. | 345/440 |
| 6,035,330 A | 3/2000 | Astiz et al. | |
| 6,128,608 A * | 10/2000 | Barnhill | 706/16 |
| 6,223,192 B1 | 4/2001 | Oberman | |
| 6,429,868 B1 | 8/2002 | Dehner, Jr. et al. | |
| 6,492,989 B1 * | 12/2002 | Wilkinson | 345/440 |

OTHER PUBLICATIONS

SigmaPlot 5.0 User's Guide, SPSS Inc., 1998, ISBN 1-56827-251-0, pp. 9-16, 151-178, 395-398.

* cited by examiner

EXAMPLE 1:

EXPRESSION (SIMPLE CROSSING OF TWO VARIABLES): (A * B)

NO EXPANDING IS NECESSARY, SO THE TREE IS SIMPLE:

OBJECT DIAGRAM:

HAND CODING:

EXPRESSION= NEW EXPRESSION (NEW FACTOR ("A"), ALGEBRA. CROSS, NEW FACTOR ("B"))

EXAMPLE 2:

EXPRESSION: (A + B) *C

THE EXPRESSION IS EXPANDED TO MONOMIALS: A*C+ B*C

OBJECT DIAGRAM:

HAND CODING:

FACTOR A = NEW FACTOR ("A");

FACTOR B = NEW FACTOR ("B");

FACTOR C = NEW FACTOR ("C");

EXPRESSION EX1 = NEW EXPRESSION (A, ALGEBRA.CROSS, C);

EXPRESSION EX2 = NEW EXPRESSION (B, ALGEBRA.CROSS, C);

EXPRESSION MAINEXPRESSION = NEW EXPRESSION (EX1, ALGEBRA.BLEND, EX2);

EXAMPLE 3

. EXPRESSION: (A * B)/C

THE EXPRESSION IS EXPANDED TO MONOMIALS:  A/C * B/C

OBJECT DIAGRAM:

HAND CODING:

FACTOR A = NEW FACTOR ("A");

FACTOR B = NEW FACTOR ("B");

FACTOR C = NEW FACTOR ("C");

EXPRESSION EX1 = NEW EXPRESSION (A, ALGEBRA.NEST, C);

EXPRESSION EX2 = NEW EXPRESSION (B, ALGEBRA.NEST, C);

EXPRESSION MAINEXPRESSION = NEW EXPRESSION
(EX1, ALGEBRA. CROSS, EX2);

COMPUTER METHOD AND APPARATUS FOR CREATING VISIBLE GRAPHICS BY USING A GRAPH ALGEBRA

CROSS-REFERENCE TO RELATED APPLICATIONS

This is a continuation of U.S. patent application Ser. No. 10/114,755, filed Apr. 2, 2002, now U.S. Pat. No. 7,023,453, which is a continuation of U.S. patent application Ser. No. 09/553,507, filed Apr. 20, 2000, now U.S. Pat. No. 6,492,989, issued Dec. 10, 2002, which claims the benefit under 35 U.S.C. § 119 (e) of U.S. Provisional Application No. 60/130,234, filed Apr. 21, 1999, the entire disclosures of each are hereby incorporated by reference.

FIELD OF THE INVENTION

This invention relates generally to a computer method and apparatus for constructing graphs mathematically and aesthetically representing graphs as graphics, and more particularly to a computer method and apparatus for constructing graphs using a graph algebra and then visually or otherwise representing the graphs as a quantitative aesthetic graphic representation.

BACKGROUND OF THE INVENTION

Until recently, graphics were typically drawn by hand to represent mathematical, statistical, and geometric relations. Computer graphics programs, particularly scientific and mathematical plotting packages, have made this task much easier but they have not altered its ad hoc aspect. Nor have statistical and mathematical packages that generate more complex graphics contributed to our understanding of how they are created.

A need exists for a computer method and system to be able to construct graphics systematically in order to handle more complex multivariate environments. This is also the case in connection with data mining computer systems. Unfortunately, the sophistication of data mining systems far exceeds the computer graphical methods used in their displays. Most data mining computer systems still rely on pie, line, and bar charts of slices of data cubes (multi-way aggregations of a subset of a database). These charts fail to reveal the relationships among the entities they represent because they have no deep grammar for generating them. They are simply hard-wired to facets of the data cube. For example, if one drills through the cube to view a different slice of the data, only a simple pie chart is obtained. A similar hard-wiring exists in displays from tree classifiers, neural networks, and other algorithms.

A need also exists for a method and apparatus for creating aesthetic graphics from data using graph algebra.

SUMMARY OF THE INVENTION

In accordance with the present invention, a computer method is provided for creating quantitative graphics using graph algebra.

In accordance with another aspect of the present invention, a data processing system is provided for constructing graphs mathematically using a graph algebra and displaying the graphs aesthetically as graphics, which can be a visual or other sensory display of the underlying mathematical graph.

In accordance with still another aspect of the present invention, a non-volatile storage medium is provided containing computer software encoded in a machine readable form for creating graphs mathematically using a graph algebra and for displaying the mathematical graph aesthetically, such as a visual representation.

In accordance with the invention, a method for creating quantitative graphics includes performing the following steps on a computer: indexing data to form a data set; converting the data set into a variable data structure, where the variable data structure is an index set; converting the variable data structure into a variable set by using at least one operation selected from the group consisting of a blend operator, a cross operator, and a nest operator; mapping the variable set into a set of points; and mapping the set of points into an aesthetic representation, which may be a visual graphic.

In accordance with another aspect of the present invention, a method is provided for creating quantitative graphics that includes the steps of: providing a list of variables; providing a list of representations for points; providing a list of coordinate systems; providing a list of aesthetic representations; selecting at least one variable from a list of variables; selecting at least one representation for points from the list of representations for points; selecting at least one coordinate system from the list of coordinate systems; selecting at least one aesthetic representation from the list of aesthetic representations; moving the at least one variable to a predetermined location; and displaying a visible graphic reflecting the at least one variable, the at least one representation for points, the at least one coordinate system and the at least one aesthetic representation.

In accordance with another aspect of the invention, the data processing system for constructing graphs mathematically and aesthetically representing the graphs as graphics includes: a computer processor; and a memory responsively coupled to the computer processor containing a set of computer instructions for: (a) indexing data to form a data set; (b) converting the data set into a variable data structure, where the variable data structure has an index set, a range and a function; (c) converting the variable data structure into a variable set by using at least one operator selected from the group consisting of a blend operator, a cross operator, and a nest operator; (d) mapping the variable set into a set of mathematical points; and (e) mapping the set of mathematical points into an aesthetic representation.

In accordance with still another aspect of the present invention, a non-volatile storage medium containing computer software encoded in a machine readable format for creating quantitative graphics is provided. The non-volatile storage medium includes: a set of computer instructions for indexing data to form a data set; a set of computer instructions for converting the data set into a variable data structure, where the variable data structure has an index set, a range and a function; a set of computer instructions for converting the variable data structure into a variable set by using at least one operator selected from the group consisting of a blend operator, a cross operator, and a nest operator; a set of computer instructions for mapping the variable set into a set of points; and a set of computer instructions for mapping the set of points into an aesthetic representation.

The methods, systems and devices in accordance with the invention allow data to be manipulated in many different ways and also represented by graphics in many different ways. Thus, the creation of graphics in accordance with the present invention is not limited by the constraints of graphical representations that are mere aggregations of a subset of a database.

BRIEF DESCRIPTION OF THE DRAWINGS

The present invention can be more readily understood by reference to the accompanying drawings in which.

Figure 1:
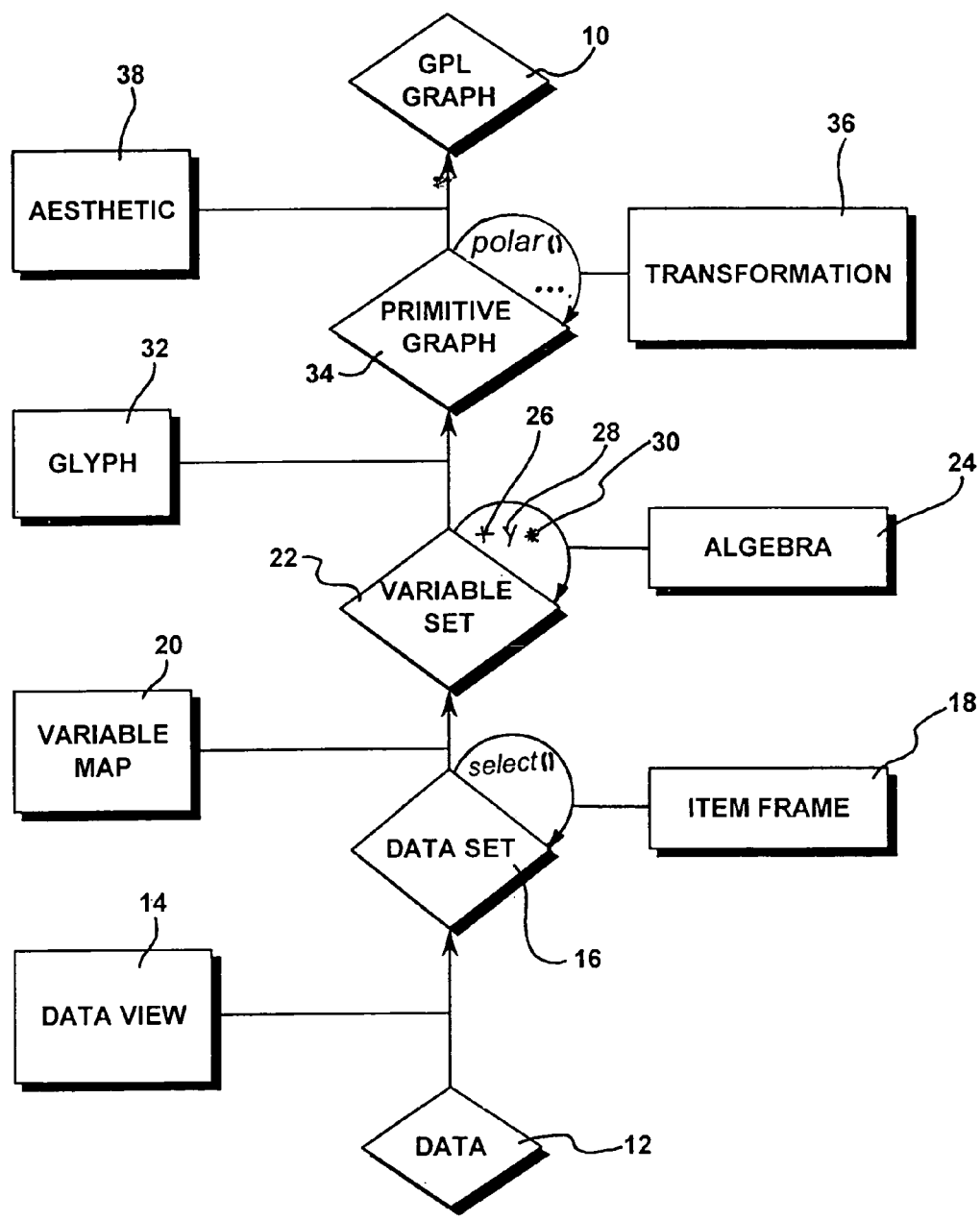
FIG. 1 is a flowchart illustrating schematically the method of forming graphics from data in accordance with the present invention.

All object diagrams depicted use standard UML notation to characterize the classes, interfaces, components, and relationships.

DETAILED DESCRIPTION OF THE INVENTION

As used throughout the specification, the following terms have the following meanings.

"Abstract" classes are general methods for defining APIs (Application Program Interfaces) and implementing those functions.

"Controllers" are software components that control interactivity in a graph. An example of a Controller is Property Change Listeners that listen to Graph Frames. Upon hearing a Property Change Event, the Controller may simply set itself to the Graph Frame 134, or it may update its appearance based on information contained in the Graph Frame 134.

"Data" means recorded observations of quantities, qualities or relations. Data have no necessary organization or structure but are a collection of information and are sometimes referred to as raw data or source data. Data also include, for example, meta-data, associated data, and annotation data.

Raw or source data may reside in computer memory in a free text file, for example.

Each piece of meta-data has a String description and can have a type to identify what type it is.

Associated data are the data that are associated with the actual data and are used for user inquiries and drill-down (investigating subsets of data).

Annotation data are data connected to the actual data that allow some kind of annotation to appear in the graph.

"Data view" is a function that indexes raw data to produce a data set. Different indexing or organizing schemes can be used as desired, such as, for example, hierarchical, relational or topological.

"Frame Model State" is a class for efficiently passing the state of a Frame Model over the wire. In DataView.addFrameModelState (Frame Model State), Data View implementations can instantiate a new Frame Model by using the constructor that takes a Frame Model State.

A "Generic Function" uses reflection to create a Function object from a fully qualified method name of a function, the target variable(s) in a Data View, and an optional Hashtable containing additional parameters for the function. The results of the function persist.

"Instantiate" means to provide an instance of.

A "Listener" is a sub-module of the computer program that senses for a command and informs the module (that the sub-module is part of) that the message has been sent so that an action can be performed.

"Renderers" are wrappers for the system toolbox/toolkit drawing objects and/or a graphics class library. Renderers are responsible for creating, drawing, hit-testing, and maintaining GPL (Graphics Production Library) Primitives 180. Hit testing is done via Pointer Events 184 which are extensions of Mouse Events 186. Thus, Renderers can add and remove Mouse Listeners and Mouse Motion Listeners. Renderers also provide layers for drawing (i.e., an object in layer 2 should be "on top of" an object in layer 1). Renderers operate in one of two "window stretch type" modes (RESIZE and NORESIZE—as below) that affect the size of the primitives relative to the enclosing window. Finally, Renderers broadcast Property Change Events when the number of layers ("Number Of Layers"), or the window stretch type ("Window Stretch Type") changes. Renderers map a MIN to MAX coordinate system on top of the actual drawing area. Coordinate values increase from left to right and from bottom to top.

"Variable" means a variable set of the form V=varset [X]. A "varset" or "variable data structure" is a set defined by:

$$\text{varset}[X_1, ..., X_n] = \{[l_m, X_1, ..., X_n, f]\}, \text{ where}$$
$$X_1, ..., X_n \text{ represents n sets,}$$
$$l \text{ is an index set } \{1, 2, ..., m\},$$
$$m \text{ ranges over all the natural numbers N,}$$
$$f: l \to X_1 \times X_2 \times ... X_n, \text{ and f ranges over all}$$
$$\text{such possible functions.}$$

V may be a categorical variable (i.e., X is a finite set); or V may be a continuous variable (i.e., X is a set of real numbers).

The following is a description of a software system in accordance with the present invention. The software may be stored on any medium, typically optical or magnetic, that is capable of retaining the software code and readable by or executed on a general purpose computer system. The software system may also be run over a network, using a typical client-server arrangement.

The following is a list of software components common to one or more of the following diagrams and the respective figures on which they are located:

| Component | FIGS. |
|---|---|
| Axis 114 | 10, 11 |
| Controller interface 40 | 2, 14, 15 |
| Coordinate Specification 50 | 2, 5 |
| Data Pass Listener interface 62 | 3, 4 |
| Data View interface 14 | 1–4 |
| Element 46 | 2, 11, 16 |
| Frame Layout Interface 42 | 2, 11 |
| Glyph interface 32 | 1, 10, 11, 13 |
| Graph 10 | 1, 2, 11 |
| Graph dimension 100 | 5, 10 |
| Item Frame Interface 18 | 1, 3, 5 |
| Legend 112 | 10, 11 |
| Legend Hit Event 130 | 10, 13 |
| Mouse Event 186 | 12, 13 |
| Pointer Event 184 | 12, 13 |
| Primitive interface 34 | 1, 12, 13 |
| Scaling Specification 48 | 2, 5 |
| Transformation 36 | 1, 11, 12 |
| Variable Transformation Specification 52 | 2, 5 |

Figure 2:
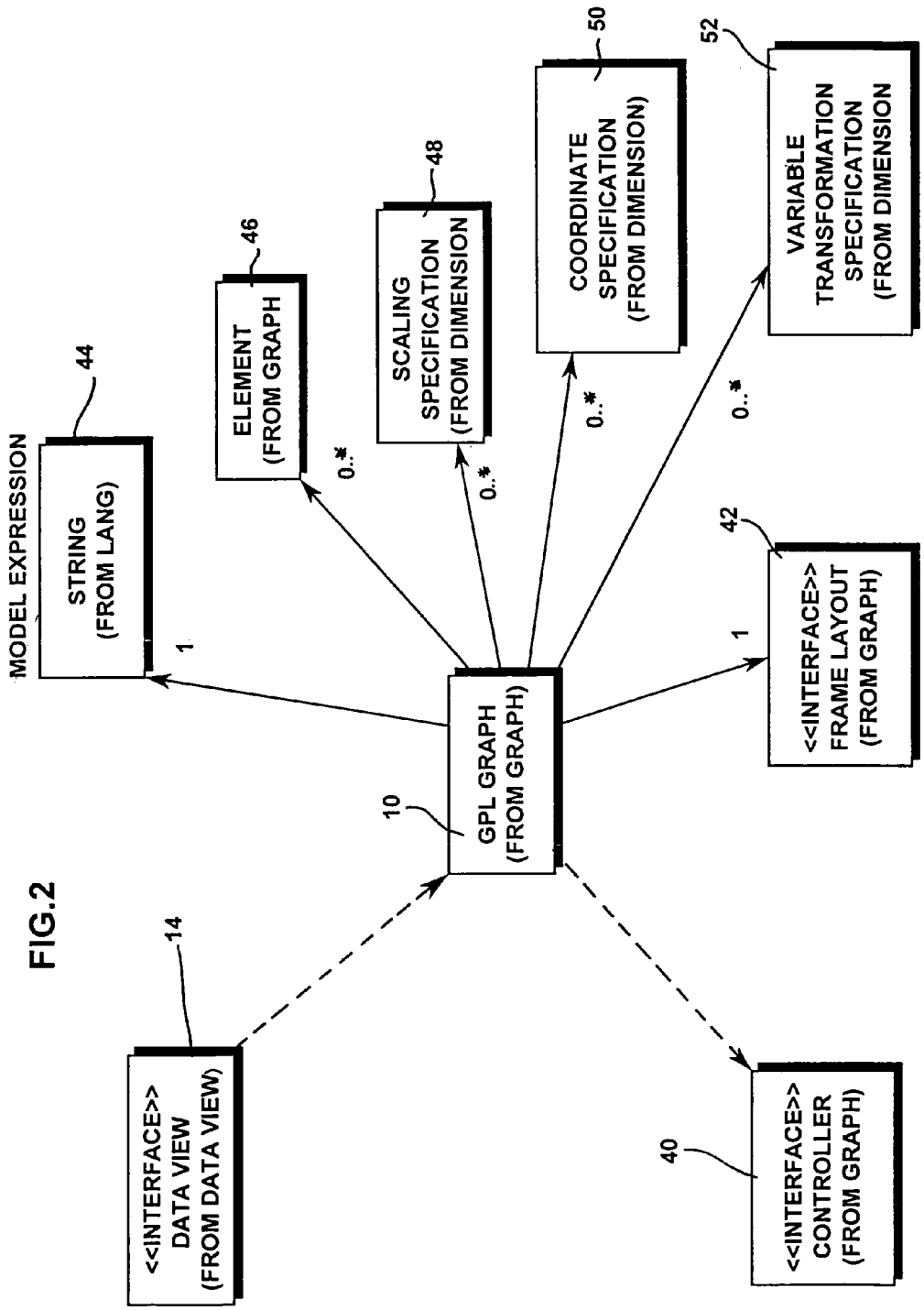
FIG. 2 is an object diagram showing the primary software components of the data processing system and their relation to one another.

Referring to the figures generally, and in particular to FIG. 2, there is illustrated an object diagram depicting the primary elements of software in accordance with the invention for producing a graphical representation of data. The four major components of the system are Graph 10, Data View interface 14, Controller interface 40, and Frame Layout interface 42.

Graph 10 may be completed by setting an algebraic model expression or String 44 and manipulating any number of properties including Elements 46, Scaling Specifications 48, Coordinate Specifications 50 and Variable Transformation Specifications 52. After Data View interface 14 of the present system acquires and manipulates data, it notifies the other software components of changes in the data. Controller interface 40 is responsible for all interactions with Graph 10, including building the graph. Frame Layout interface 42 controls the look and feel of Graph 10.

Figure 18:
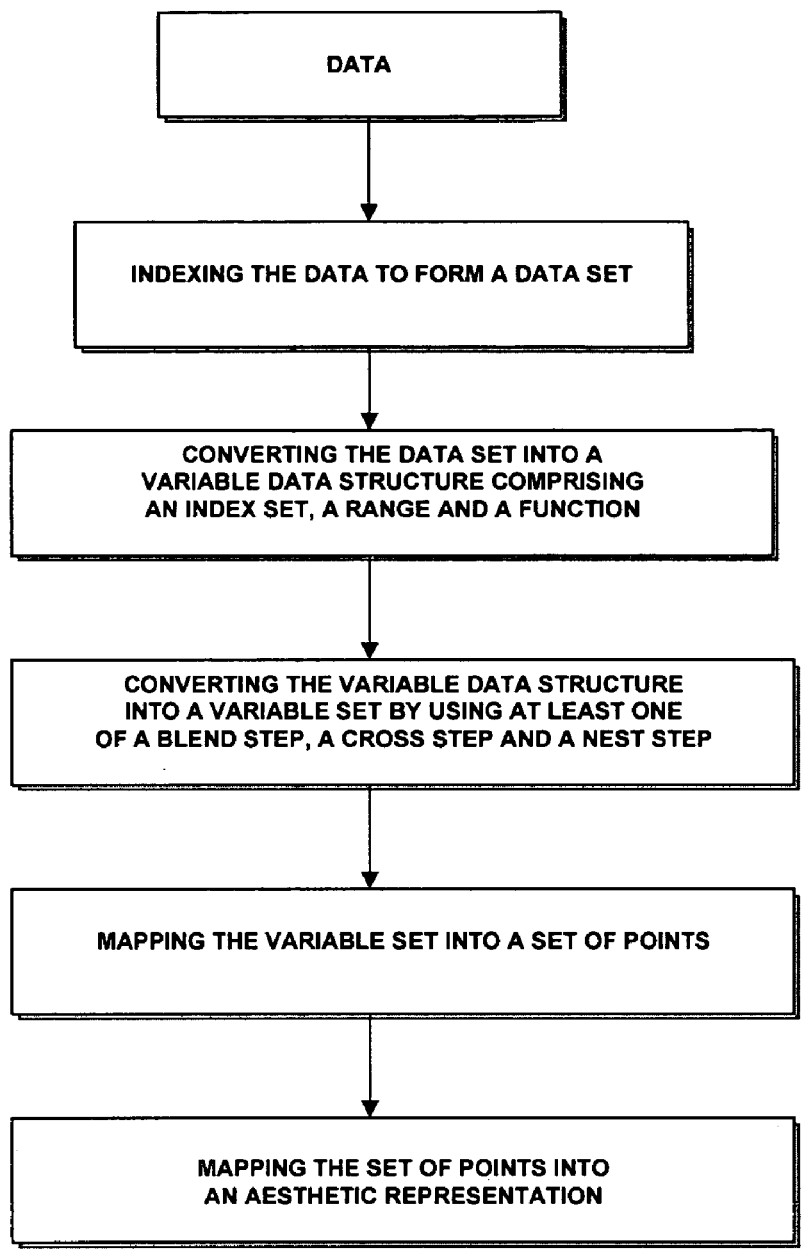
FIG. 18 is a flowchart illustrating schematically an alternate method of forming graphics from data in accordance with the present invention.

Shown in FIGS. 1 and 18 are block diagrams illustrating schematically the method and system, in accordance with the invention, for producing a graphical representation of data. FIG. 1 depicts the overall sequence of operations that the computer software undertakes to visually represent information in graphical form as Graph 10. The components of Graph 10 are Data 12, which are recorded observations of quantities, qualities or relations. Prior to representation in graphical form, Data 12 have no necessary organization or structure.

As shown in FIG. 1, Data View 14 is a function that produces a Data Set 16 from Data 12. Different Data Views 14 utilize different schemes to organize Data 12. The Data View object implements Data View 14 by establishing an indexing scheme and associating Data 12 with the indices to produce Data Set 16, an indexed set of Data 12. Each element in Data Set 16 is referred to as an "entry" or a "value." Data Set 16 is indexed by some scheme that enables the user to find Data 12 in Data Set 16 and associate the separate elements with each other.

Item Frame 18 is an interface that specifies a collection of functions on index sets. These functions are transformations on index sets; they produce index sets. Some functions in Item Frame 18 may permute indices; for example, a tree structure (see FIGS. 8 and 9, for example) can be converted to a sequential list of indices. Other Item Frame 18 functions may subset a Data Set 16 by converting some indices to null values (i.e., deleting them). Functions of Item Frame 18 are used to organize and filter out Data 12 needed for creating variables.

After Data 12 has been indexed into Data Sets 16, a Variable Map 20 function maps a Data Set 16 to a Variable Data Structure—also termed "Varset." A Variable Data Structure is a set defined as follows:

$$\text{varset}[X_1, ..., X_n] = \{[l_m, X_1, ..., X_n, f]\}, \text{ where}$$
$$X_1, ..., X_n \text{ represents n sets,}$$
$$l \text{ is an index set } \{1, 2, ..., m\},$$
$$m \text{ ranges over all the natural numbers N,}$$
$$f: l \rightarrow X_1 \times X_2 \times ...X_n, \text{ and f ranges over all}$$
$$\text{such possible functions.}$$

Variable Data Structure is also a variable set of the form V=varset[X], where the variable set has not been subjected to algebra. Variables are categorical or continuous, based solely on how the variables are defined. V is a categorical variable when X is a finite set; V is a continuous variable when X is a set of real numbers.

The mapping occurs from a key index set to sets of values in the Data Set 16. Variable Map 20 must monitor the range of each variable so that errors in Data Set 16 may be trapped. For example, if a value in Data Set 16 is out of range, Variable Map 20 must either be able to assign the value appropriately or advise that the value on the variable cannot be processed. Variable Map 20 must also continue to correctly return values in range for all possible values in a domain while Data Set 16 changes over time.

After Data Set 16 is mapped by Variable Map 20 into Variable Data Structure, the Algebra object implements an Algebra 24 on the Variable Data Structure. The output of Algebra 24 is a Variable Set 22 as shown in FIGS. 1 and 18. An "algebra" is a collection of sets, operators on sets, and rules for the combination of the operators. An operator is a function defined on the set that returns a value in that set.

Algebra 24 has three binary operators—blend (+) 26, nest (/) 28, and cross (*) 30—and a set of associated rules. The hierarchical order of the operators is blend (+) 26, cross (*) 30, and nest (/) 28. Blend 26 is evaluated last, while nest 28 is evaluated first. The order of the operators may be changed through the use of parentheses. The rules for the operator include associativity, distributivity, and commutativity. Only blend 26 is commutative. Blend operator 26 involves a union in the range. The cross operator 30 involves a Cartesian product in the range. The nest operator 28 stratifies values.

Figure 5:
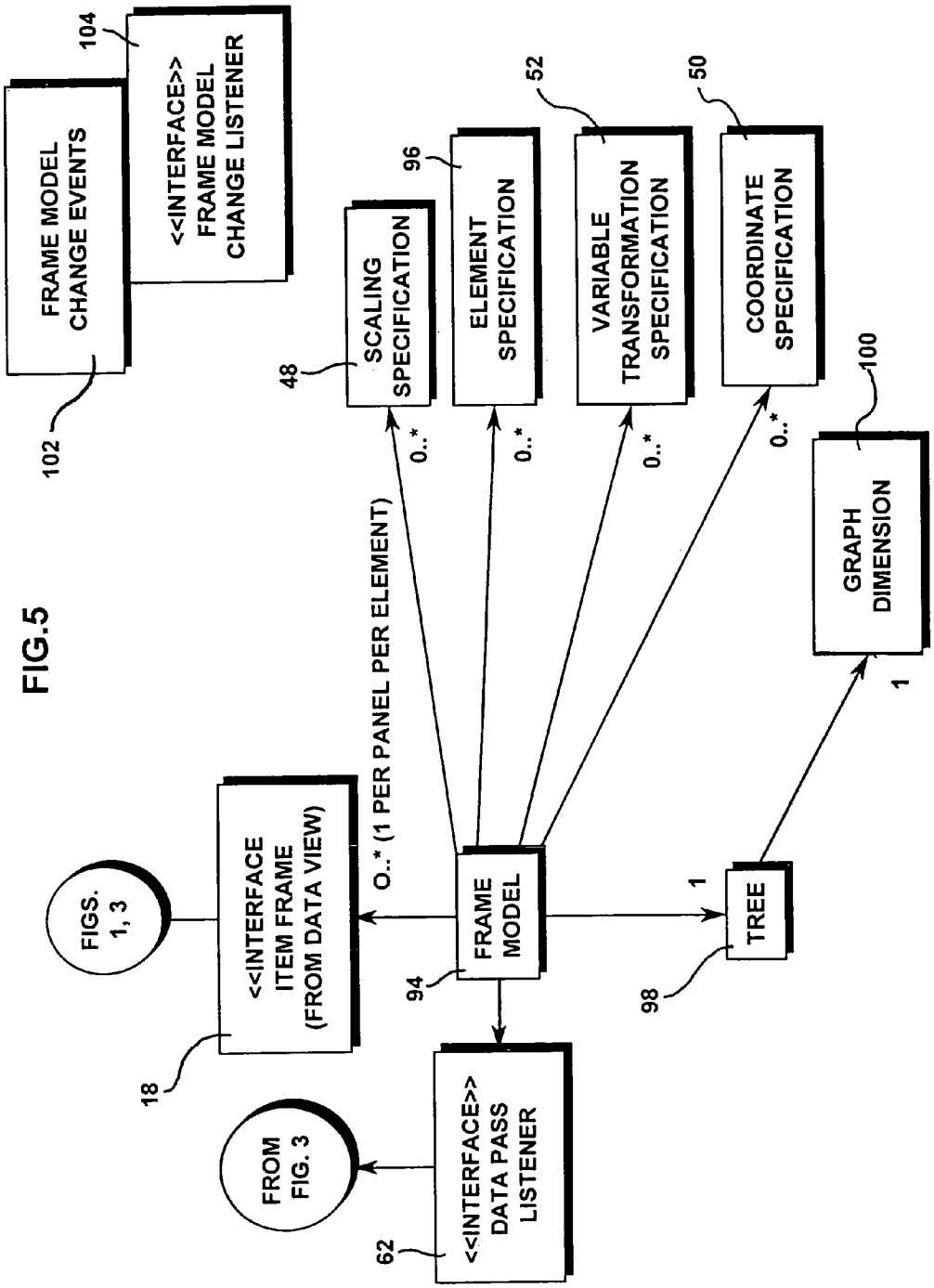
FIG. 5 shows an object diagram of the Frame Model of the present invention.

The software component that contains all the algebraic specifications for mapping data sets to variable sets is the Frame Model 94, which is illustrated in FIG. 5. Frame Model 94 also contains the structure of dimensions that become a Graph Frame 134 (from FIG. 11) and Data 12 (from FIG. 1) for Elements 46.

The algebraic specifications include Variable Transformation Specifications 52, Scaling Specification 48, Coordinate Specifications 50, Element Specification 96, and a Tree 98. The actual frame structure is created by interpreting all of these specifications into a Tree object 98, as well as the element Graph Dimensions 100, and the Item Frame interface 18 that re the Data 12 for Graph 10.

Tree 98 comprises Graph Dimensions 100 (from FIG. 10) organized in a form that is "ready" for a view to construct a graph. Tree 98 can be made up of any number of sub-Trees, where each "level" of a tree represents a crossing dimension and the rows represent nesting dimensions. Blends 26 are done by blending two Trees 98 with identical structures (expanding the algebra guarantees Aesthetics this is the case). Blending 26 two trees creates new levels in a tree. Nesting 28 two trees creates "rows" in a tree. The following are examples of algebraic statements and their Tree equivalents:

EXAMPLE 1

```
Algebraic expression: a * b * c * d * e * f
Tree Equivalent:
|
| [e]
|  [d]
|   [c]
|    [b]
|     [a]
|
```

EXAMPLE 2

```
Algebraic expression: a*b + a*c
Tree equivalent:
|
| [c] + [b] = [c + b]
|  [a]  [a]    [a + a]
|
```

EXAMPLE 3

```
Algebraic string: a * b/c * 1 * c
Tree equivalent:
|
| [1]
|  [c]
|   [b/c = 1]
|    [a]
|   [b/c = 2]
|    [a]
|   [b/c = 3]
|    [a]
|
```

EXAMPLE 4

```
Algebraic expression: y * 1 * (a*b)/c * 1
Tree equivalent:
|
| [1]
|  [c]
|   [b/c = 1]
|    [a/c = 1]
|     [1]
```

-continued

```
|    [y]
|   [b/c = 2]
|    [a/c = 2]
|     [1]
|    [y]
|
```

Figure 6:
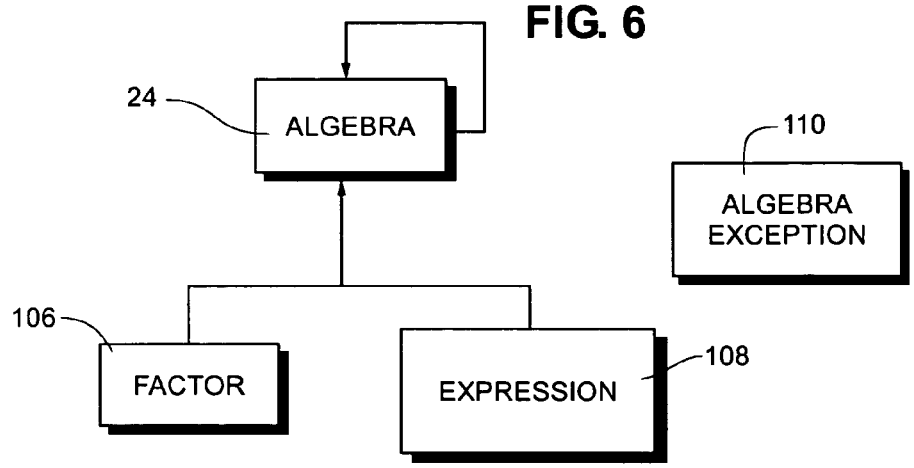
FIG. 6 is a diagram of the Algebra Package of the present system.

FIG. 6 depicts the Algebra Package as a tertiary tree model. The Algebra Package is a simple object model for algebraic expressions, comprising three classes: Algebra 24, Factor 106, and Expression 108. In the model shown, Algebra 24 is the abstract superclass, and Factor 106 and Expression 108 are subclasses of the superclass. Algebra 24 converts String 44 (shown in FIG. 2) to Tree 98 (from FIG. 5). Factor 106 is a basic unit of Algebra 24. Factors 106 correspond directly to the string names of Variable Set 22 (from FIG. 1). For example, "a" and "b" are factors in the Expression "a+b".

Expressions 108, which are also represented by tertiary trees, consist of a left side, a right side, and an operator. The sides are instances of Algebra 24 (i.e., either Expressions 108 or Factors 106). The operator is one of blend (+) 26, nest (/) 28, and cross (*) 30.

String 44 expressions are expanded into monomials and then parsed to create an Expression object. Expansion is carried out by a static method in Expression 108 that examines the original String 44 and expands it out to monomials in a new string taking into account the rules for associativity, distributivity, and commutativity. The operators for expanding the Expression are blend (+) 26, nest (/) 28, and cross (*) 30. Another static method then takes the expanded string and parses it to create an actual Expression object. Any algebraic Expression object could also, conceivably, be created by hand.

The examples shown below illustrate how to "hand code" an algebra Expression:

EXAMPLE 1

Expression: (simple crossing of two variables): (a*b)

This Expression may be hand coded as follows:

Expression=
   new Expression (new Factor("a"), Algebra.CROSS, new Factor("b"))

Figure 7:
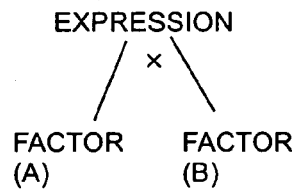
FIG. 7 is an object diagram of a simple algebraic expression.

The object diagram for this example is shown in FIG. 7.

EXAMPLE 2

Expression: (a+b)*c

The expression is expanded to monomials: a*c+b*c

The expression may be hand coded as follows:

Factor a=new Factor("a");
Factor b=new Factor("b");
Factor c=new Factor("c");
Expression ex1=new Expression(a, Algebra.CROSS, c);
Expression ex2=new Expression(b, Algebra.CROSS, c);
Expression mainexpression=
   new Expression (ex1, Algebra.BLEND, ex2)

Figure 8:
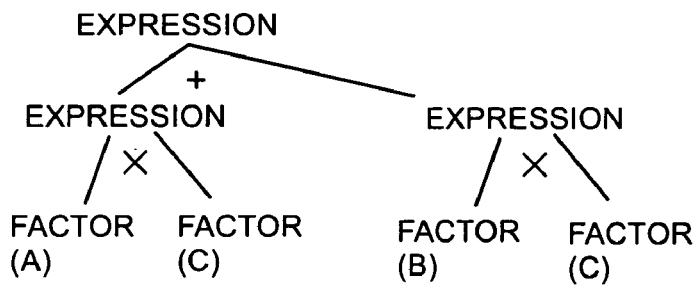
FIG. 8 is an object diagram of an algebraic expression.

The object diagram is shown in FIG. 8.

EXAMPLE 3

Expression: (a*b)/c

The expression is expanded to monomials: a/c*b/c

The expression may be hand coded as follows:
Factor a=new Factor("a");
Factor b=new Factor("b");
Factor c=new Factor("c");
Expression ex1=new Expression(a, Algebra.NEST, c);
Expression ex2=new Expression(b, Algebra.NEST, c);
Expression mainexpression=
    new Expression (ex1, Algebra.CROSS, ex2)

Figure 9:
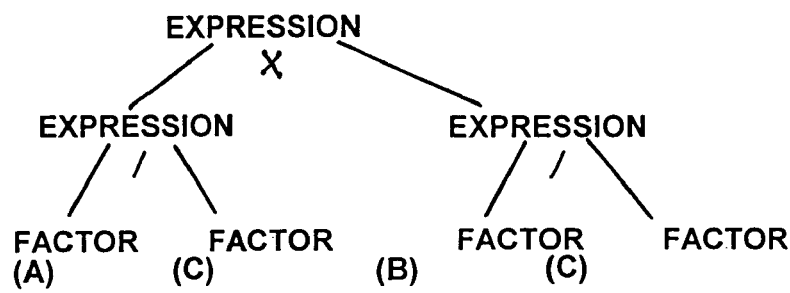
FIG. 9 is an object diagram of an algebraic expression.

The object diagram is shown in FIG. 9.

Algebra Exceptions 110 are also provided for certain functionalities that cannot be processed in the normal Algebra class 24.

Figure 3:
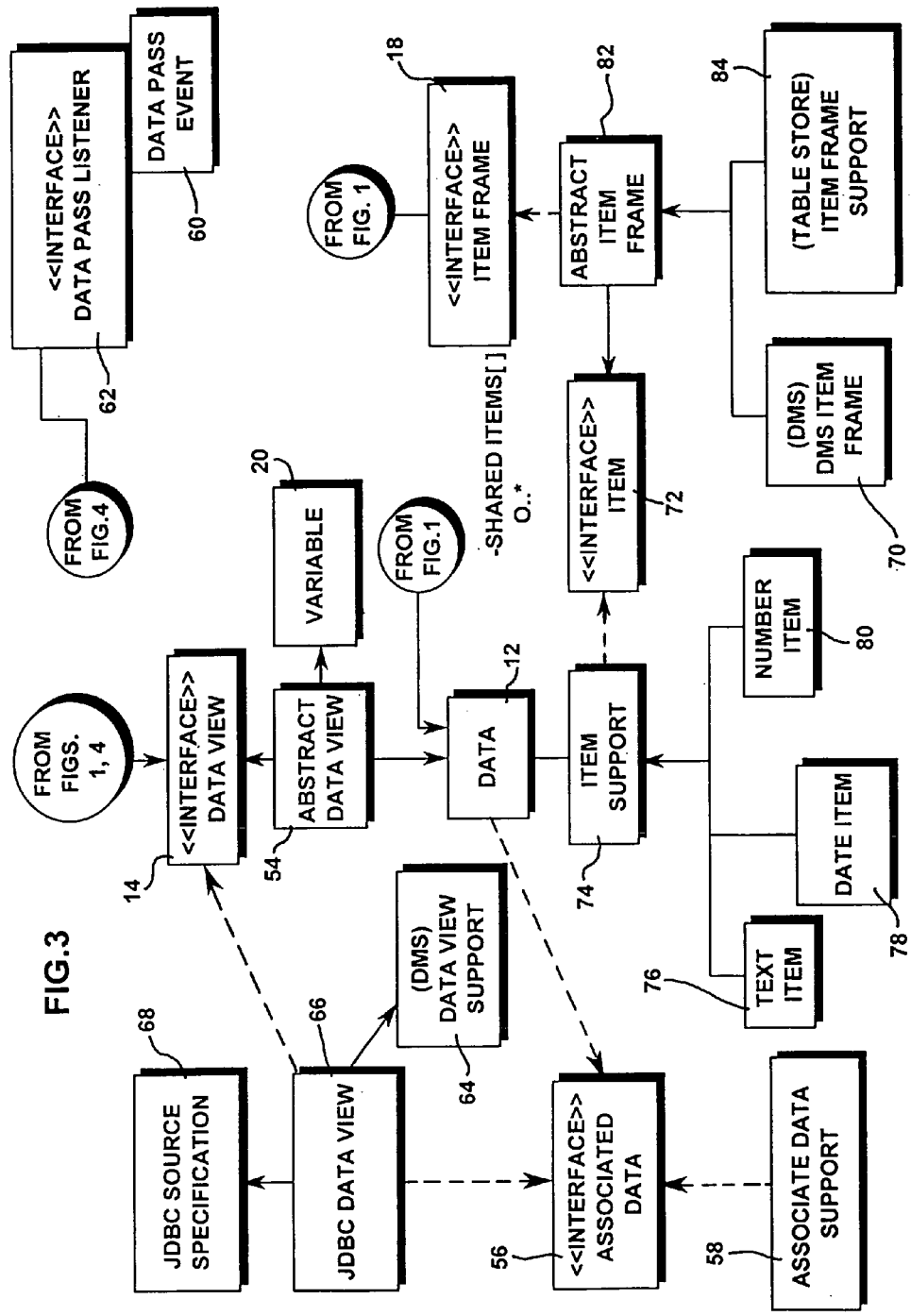
FIG. 3 is an object diagram of the Data View package of the present invention.

FIG. 3 shows an object diagram of the entire Data View Package of the present system. The Data View Package contains the classes that allow the program to access and manipulate data. Data View interface 14 provides Data 12 in the form of the geometry needed to create a graph. Data View interface 14 also acts as the "lens" for the software in that it is what the rest of the system "sees" when it requests Data 12. Abstract Data View class 54 implements functions of Data View interface 14. The geometry for each element of each panel (facet) of a graph is stored in the Item Frame interface 18, which is basically a table.

The Data View package also provides a way to include Associated Data interface 56 (graph meta-data). Associated Data interface 56 has a support class, Associated Data Support 58, which supports the routines required by the software to access other data and link that data to the primary Data 12.

The Data View Package also contains Data Pass Event 60 and the corresponding Data Pass Listener interface 62 which notifies clients when a data pass is about to happen and when the data pass is finished. Data View 14 fires a Data Pass Event 60 anytime there are changes to Data View 14; e.g., when new data are added to a Data View.

A complete data pass happens as follows:

A client makes a call on DataView.beginDataPass( ).

The Data View interface 14 clears all previous Specifications (including Scaling Specification 48 (from FIG. 2), Element Specification 96 (from FIG. 5), Variable Transformation Specification 52 (from FIG. 2), Coordinate Specification 50 (from FIG. 2) and Frame Model State.

Data View interface 14 notifies listeners via aboutToDataPass( ).

Listeners add any specifications required for the data pass. For example, Frame Model 94 (shown in FIG. 5)—which is also a Data Pass Listener interface 62—adds a copy of the specs (in the form of a Frame Model State object).

The data pass happens.

When the data pass is complete, Data View interface 14 notifies listeners via finishedDataPass( ).

The listeners can get their data if needed via DataView.getResults( ).

The most critical function performed by Data View interface 14 is processing the specifications contained in a Frame Model. These specifications are the data manipulations that must be performed to draw the Elements 46 (from FIG. 2) in a graph. These specifications are the "graph grammar"; they include Algebraic Expression, Scaling Specification 48 (from FIG. 2), Element Specification 96 (from FIG. 5), Variable Transformation Specification 52 (from FIG. 2), and Coordinate Specification 50 (from FIG. 2), discussed above. Data View interface 14 takes the specifications and creates the geometry for the elements in a Frame Model (from FIG. 12). Other requirements are brushing support and case-level access. Exceptions are provided for concrete Data View interface 14 that cannot support certain functionality.

A support class, Data View Support 64, is provided along with an implementation of Data View interface 14 using JDBC (Java DataBase Connectivity) Data View 66 which gathers source data from JDBC Source Specification 68. JDBC Data View 66 provides a link to a database such that the program can use data from that database. Data View Support 64 is an implementation of Data View interface 14 that uses Data Management System (DMS) Item Frame 70. DMS Item Frame 70 acts as a pointer which points to a single item in a data management system. JDBC Data View 66 includes a JDBC Data View Customizer (not shown) for setting up the data source(s) for Data 12, meta-data, and synthetic variables.

The JDBC (Java DataBase Connectivity) Data View Customizer is a UI (user interface) for customizing JDBC Data View 66. It provides the ability to customize all the database requests in a JDBC Data View 66, as well as the ability to add synthetic variables via functions. The following describes the UI screens:

Main Data (2 screens)—The first screen asks for the JDBC Driver, the database URL, a user name, a password, and an SQL (Sequential Query Language) statement. The second screen prompts the user (a) to identify each variable in the result set as categorical and (b) to choose a type for each variable (Number, Text).

Table Meta (2 screens)—The first screen asks for the JDBC Driver, the database URL (Universal Resource Locator), a user name, a password, and an SQL statement. The second screen prompts the user to choose (a) a column in the result set that contains the descriptions of meta-data, (b) a column that contains the MIME types for the meta-data, and (c) a column that contains the actual meta-data.

Variable Meta (2 screens)—The first screen asks for the JDBC Driver, the database URL, a user name, a password, and an SQL statement. The second screen prompts the user to identify (a) the column in the result set that matches the variable names, (b) the columns to use for meta-data, and (c) the MIME types for each.

Value Meta (2 screens)—The first screen asks for the JDBC Driver, the database URL, a user name, a password, an SQL statement. The second screen prompts the user to identify (a) the column in the result set that matches the category names, (b) the columns to use for meta-data, and (c) the MIME types for each.

Item Meta (2 screens)—The first screen asks for the JDBC Driver, the database URL, a user name, a password, an SQL statement, and the variable to add value meta-data to. The second screen prompts the user to identify which columns to use for meta-data and the MIME types for each.

Functions (1 screen)—The screen prompts for a new (synthetic) variable based on a function, and one or more of the existing variables. Double clicking on the synthetic variable box allows the user to edit the synthetic variable. "Add" adds a new synthetic variable, and "Remove" removes the synthetic variable.

Also provided in the Data View package is an Associated Data interface 56 (meta-data) model for linking information to arbitrary objects. Associated Data interface 56 can be attached to an individual Item of Data 12, groups of Data Items, Variable Sets 22, categories within a Variable Set 22, or entire tables. Abstract class Item Support 74 is a general method for defining an API and implementing a function of Item interface 72. Item Support 74 may use any of a Text Item 76, a Date Item 78, or a Number Item 80. Abstract Item Frame 82 implements functions of Item Frame interface 18. Abstract Item Frame 82 has a support class Item Frame Support 84.

The basic drawing interface, Primitive Graph interface 34 (from FIG. 1), implements Associated Data interface 56 so that meta-data can be encoded into any object that is drawn on the screen. Associated Data 56 may consist of any valid Java object. Each piece of associated data includes a String 44 description of the associated data, the data itself as a Java object, and an optional MIME type for that data. The MIME type can be used by clients to determine an appropriate "player" for the meta-data.

Functions are implemented using static final classes. The methods in this class operate on Primitive 180 (from FIG. 12). The Generic Function class (not shown) is a Function object that uses Java reflection on the static methods. Based on a String function name, a Generic Function object looks up the correct method and becomes a Function compliant object. Thus we get the effect of potentially many kinds of Function objects using relatively few classes. Also, to include more functions, we need only add additional primitive operations to the static final classes.

After Variable Set 22 has been attained, the next step of the inventive method is to map a set from Variable Set 22 into a set of points. This is accomplished by a Glyph 32—an interface that uses a particular graphing function to produce a Primitive Graph 34 from a set in Variable Set 22. Glyph 32 also executes other housekeeping tasks; for example, relating the sets in Variable Set 22 to the dimensions of a geometric space in which the graph will be imbedded.

The resulting Primitive Graph 34 is a subset of crossing sets. The graph object is a collection comprising Primitive Graph 34 and the methods needed for representing the Primitive Graph 34 as a geometric object.

After the Primitive Graph 34 is obtained, the next step of the inventive method comprises transforming Primitive Graph 34 and representing it in the form of a coordinate system. This is done via Transformation 36. Transformation 36 is a system or scheme for locating a point in a space given its coordinates. This scheme includes an Axis 114 for each dimension, a scale (see FIG. 10) for each Axis 114, and a method for locating any point in the space. The best known coordinate system is the Cartesian coordinate system. The default coordinate system is Coordinate System 2D 140, a Graph Frame for two-dimensional graphs. The Transformation object transforms Primitive Graph 34 and represents it in rectangular, polar, or other coordinate systems, including, for example, conformal mappings and geographic projections. However, Transformations 36 are limited to transformations that maintain the functional relationship between the domain and the range of a particular Primitive Graph 34.

Coordinate Specification 50 is used to denote faceting when there is ambiguity in the number of dimensions. Each Coordinate Specification makes a particular facet explicit. For example, a graph with six dimensions a*b*c*d*e*f could be a two-dimensional graph faceted in two space twice or a three-dimensional graph faceted in three space. Using a Coordinate Specification 50 makes it clear how the graph is faceted.

A final step in the construction of the graph involves aesthetically representing the set of points into graphics. This step comprises mapping the set of points into an aesthetic representation by applying Aesthetic 38. Aesthetic 38 is a function that maps points or entries of points to strings or real numbers that serve as input to a physical display device. Aesthetic 38 is also an object that implements aesthetic functions in the construction of a Graph 10.

Graph 10 is a composite image of Primitive Graph 34 prepared under one or more Aesthetic functions 38. The graphic object is responsible for realizing the Graph 10 in a display system.

Figure 10:
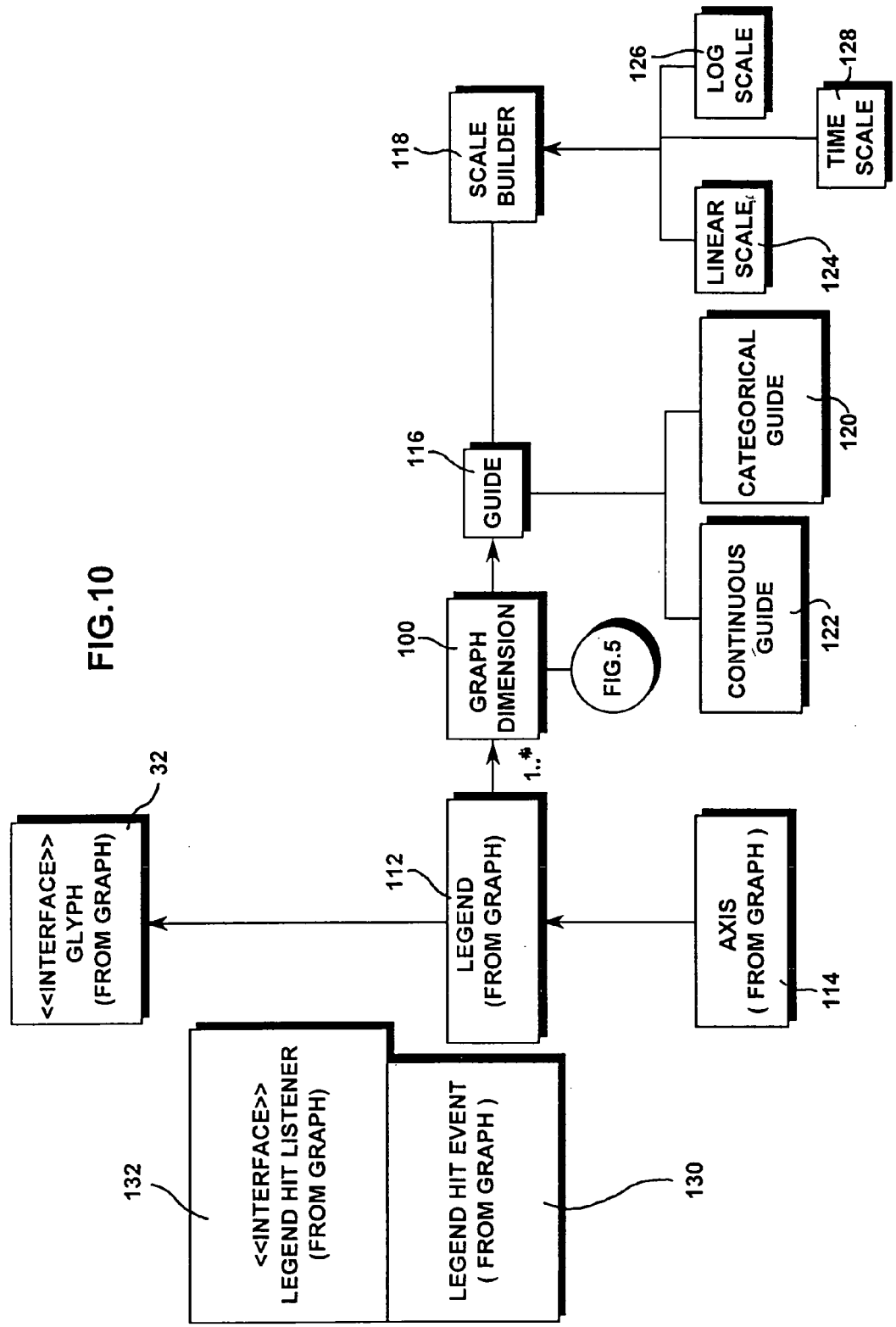
FIG. 10 is an object diagram of the Dimension aspect of the present invention.

FIG. 10 presents an overview of the dimensional aspects of the present invention. In general, Graph Dimension 100 is a re-expression of Data 12 where the data values have been mapped to a numeric scale. String 44 (from FIG. 2) contains the instructions for carrying out the re-expression of Data 12. Graph Dimension 100 parses an Expression tree to determine how to combine the data in the form of Variable Sets 22 (from FIG. 1). Graph Dimension 100 then maps the items of one or more Variable Sets 22 onto a scale that is one dimension in a Graph Frame 134 (shown in FIG. 11). A Guide 116, contained in Graph Dimension 100, is used to map the results to a numeric scale.

In the case of categorical variables, the numeric scale is an integer from zero to a value defined by (number of categories −1); in the case of continuous variables, the numeric scale goes from min(data) to max(data). Graph Dimension 100 maps attributes that can be any of those defined by the "type" of Graph Dimension 100, such as position (e.g., size, shape), color (e.g., hue, brightness or saturation), motion, rotation, blur, transparency, or texture (e.g., pattern, orientation, or granularity), for example. Alternatively, the attribute may be non-visual, such as sound, for example. Graph Dimension 100 is considered to be a "model," and Legend 112 and Axis 114 are "views" of the model.

Graph Dimension 100 will preserve the Associated Data interface 56 (from FIG. 3) (meta-data) from all of the Variable Sets 22 that it contains. Variable level meta-data are combined and can be retrieved via getAssociatedData( ). Categorical level meta-data are preserved and combined within categories and can be retrieved via getAssociatedDataFor( ).

As shown in FIG. 10, Guide 116 contains a Scale Builder object 118, which builds the numeric scale for the dimension. The numeric scale can be any Scale Builder 118 object, and the attributes are an array of Java objects. If there are fewer attributes than scale values, Guides 116 will recycle through the attribute list. The Guide 116 abstract class treats Categorical Guide 120 and Continuous Guide 122 in the same manner. Categorical Guide 120 maps attributes and categories to a numeric scale that runs from zero to the value n−1, where n represents the number of categories. Continuous Guide 122 maps attributes to a continuous numeric scale.

Scale Builder 118 takes the minimum and maximum values for a group of numbers and creates a scale. The client can request to use any of the following:
 a specific minimum,
 a specific maximum,
 a specific number of ticks, and/or
 a specific spacing between ticks (delta).

Note that setting the number of ticks can override delta, and vice-versa.

Guide 116 is responsible for mapping the values on the numeric scale to the appropriate attributes. Both Guide 116 and Scale Builder 118 are abstractions. Concrete Guides 116 are either Categorical Guide 120 or Continuous Guide 122 depending on the data, and concrete Scale Builders 118 are Linear Scale 124, Log Scale 126, or Time Scale 128.

Axis 114 and Legend 112 use the model to draw pictures. Graph Frame 134 (from FIG. 11) also uses this model.

Axis 114 is a legend for positional Graph Dimensions. Axes should be assigned only one Graph Dimension, and it should be of type POSITIONAL. Axes do not use GPL Symbol for the tick marks; rather, they use instances of GPL Line (so Transformations work correctly). Axis also allows for minor ticks and a rule. The minor ticks are determined using a Scale Builder to build a scale between the major ticks. Both the rule and the ticks (and minor ticks) have their own instance of Aesthetics.

Legend 112 is a picture of one or more Graph Dimensions 100. Legend 112 takes the information from Graph Dimension 100 and creates a picture using Primitive Graph interface 34 objects in a Renderer interface 152 (from FIG. 12). Legends are made up of segments that correspond to the values that are on the legends (these are categories in a categorical case). Each segment has four pieces: the major tick, the tick label, the minor ticks, and the rule. In an alternative embodiment, Legends can have a label on the north, south, east, or west side and may be oriented vertically or horizontally. The individual legend elements comprise text associated with a symbol. The strings are considered to be "tick labels," and the symbols are considered to be "ticks". The default symbol is a Symbol 170, but it can be set to any symbol type—e.g., Polygon 154, Rectangle 164, Circle 172; this, however, may be overridden if Graph Dimension 100 is of type SHAPE. Symbols are simple shapes that have a location and size. The constants defined in this interface describe what the symbol should look like.

Legend 112 works by looking up the corresponding attribute for a given scale value obtained from a Graph Dimension 100 and using the attribute to modify Aesthetics 38 of the tick (i.e., the symbol). The Aesthetics class 38 holds all aesthetic attributes for drawing a primitive graph. The attributes may be visual or non-visual, such as sound, for example. Renderer interface 152 (from FIG. 12) applies Aesthetics 38 when the primitive graph is drawn.

The tick label is also obtained by looking up the scale value on the Graph Dimension 100. Many options control the appearance of Legend 112 and layout; these are set via the Graph Frame's Frame Layout object 42, shown in FIG. 11. Legends 112 register themselves with a Renderer interface 152 to receive Pointer Event 184 (shown in FIG. 12). Upon receiving a Pointer Event 184, Legend 112 will determine what part of the Legend 112 was hit and will then fire a Legend Hit Event 130 to Legend Hit Listener interface 132 (shown in FIG. 10). Legend 112 will notify the Legend Hit Listener 132 via one of four methods depending on what part was hit: a tick, a tick label, the legend label, or any other part of the legend 112. Legend Hit Event 130 inherits from Pointer Event 184, which inherits from Mouse Event 186, so all of the information associated with the hit is preserved.

Legend Hit Event 130 contains information concerning both the location of the hit and the values on Legend 112 that correspond to the hit if such values exist (i.e., if a tick or tick label was hit). The size of the "values" array will be equal to the number of Graph Dimensions 100 on Legend 112.

The only difference between Legend 112 and Axis 114 is how the two are drawn. As Legend 112 and Axis 114 each have their own Scale Builder 118, Axis 114 inherits from Legend 112. Scale Builder 118 creates an independent scale for the Axis 114 so that it can be adjusted without changing the model. Axis 114 also adds minor ticks, a rule, and redefines the major ticks as Lines 156 rather than Symbols 170. The minor ticks are created using a Scale Builder object 118 that builds a scale between two major ticks in a section of the Axis 114 and draws a minor tick for each value on the scale. Thus, the placement of minor ticks depends on the particular scale used to create the ticks—e.g., Linear scale 124, Log scale 126, or Time Scale 128. As with Legend 112, Axis 114 can translate between data coordinates and renderer coordinates.

Figure 11:
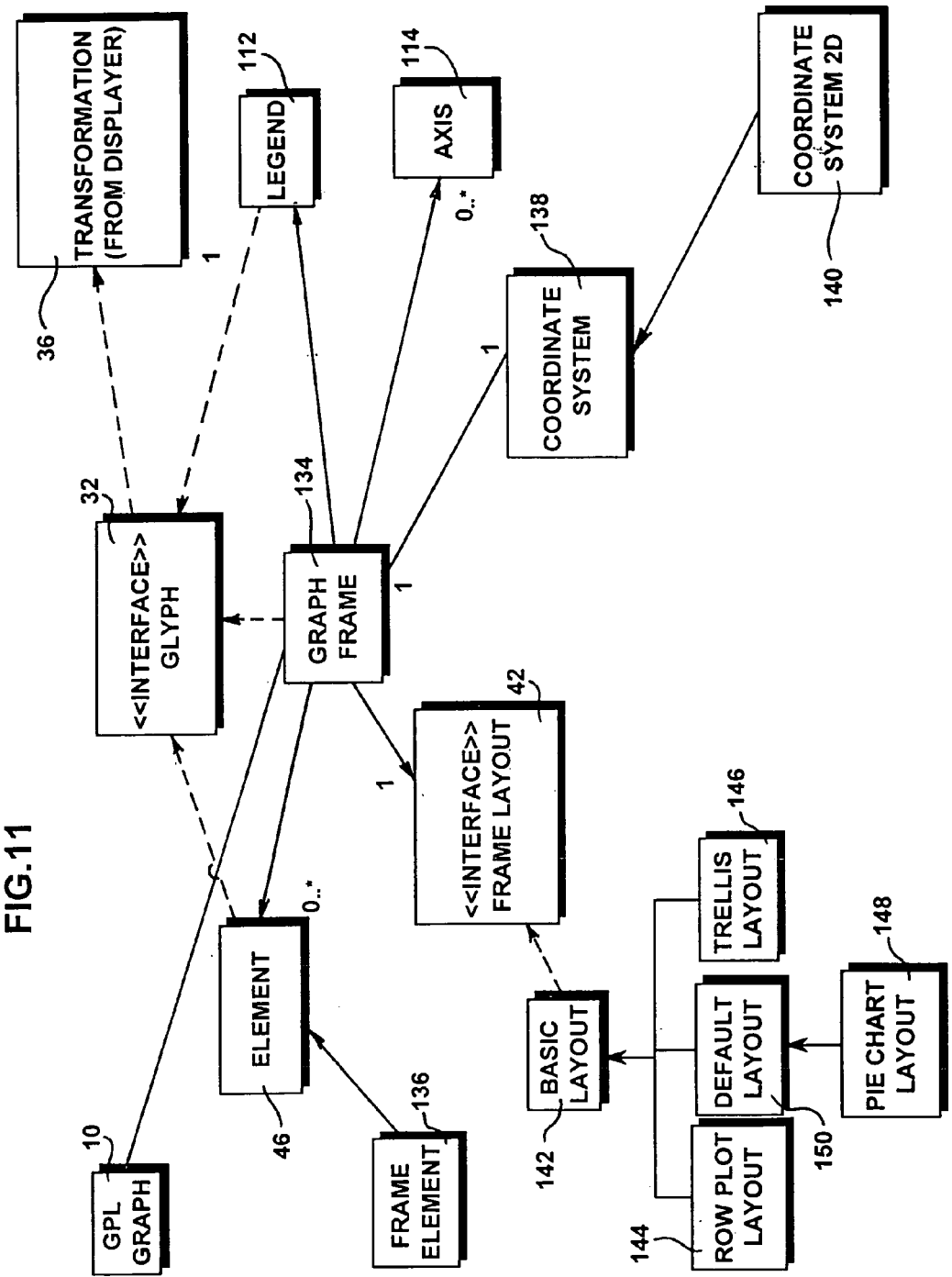
FIG. 11 is an object diagram showing the Frame aspect of the present invention.

FIG. 11 is an object diagram of the frame and layout aspect of the present invention. The design for frames is separated into a model and a view.

The model, Frame Model 94 (shown in FIG. 5), is a software component that provides the structure of Graph 10 and contains Graph Dimensions 100 (from FIG. 10), dimensions for Elements 46, and Data 12 for Elements 46.

The view, Graph Frame 134, is a component that provides a picture of the model by building graphs from the Tree 98 of dimensions held in Frame Model 94.

Frame Model 94 and Graph Frame 134 communicate via Frame Model Change Events 102 (shown in FIG. 5). Frame Model 94 also broadcasts Frame Model Change Events 102 to Frame Model Change Listener interface 104.

Frame Layout interface 42 (from FIG. 2) provides detailed control over the look and feel of a graph. Basic Layout abstract class 142 provides setter/getter methods for many properties such as fonts, colors, placements, where ticks cross Axis 114, for example, and many others. Frame Layout interface 42 works by making API calls on gpl.graph objects as they are being built. Frame Layout interface 42 gets two chances to make changes to Graph Frame 134: the first, before the components of a Graph Frame 134 have been built; and the second, afterwards. Graph Frame 134 comprises its Elements 46 (including Frame Element 136), its Legend 112, and its Axes 114.

Basic Layout 142 is a Frame Layout interface 42 that provides the methods required for basic control over the look and feel of Graph Frames 134. Basic Layout 142 provides only the default values; the subclasses modify the paneled graphs.

Concrete Frame Layouts can modify sizes, spacing, and visibility to achieve a particular look. As shown in FIG. 11, four concrete layouts are provided: Row Plot Layout 144, Trellis Layout 146, Pie Chart Layout 148, and Default Layout 150. Each of these is a Frame Layout interface 42 and is summarized below:

Row Plot Layout 144 produces a graph with a "Row Plot" look and feel. Some characteristics of this look and feel include:
  a) gray background with white gridlines,
  b) white space between panels, and
  c) alternating X-axis positions between panels.

Trellis Layout 146 is based on the "trellis" displays from W. S. Cleveland's *Visualizing Data*, and produces a graph with a "Trellis" look and feel. Some characteristics of this look and feel include:
  a) white background and light gray gridlines,
  b) strip labels on each child frame,
  c) white space between panels, and d) alternating X-axis positions between panels: alternate between bottom of entire graph and top of entire graph.

Default Layout 150 is similar to Row Plot Layout 144, but it does not attempt to repress any axes labels in paneled graphs. Default Layout 150 is used when Graph Frame 134 specifies no layout.

Pie Chart Layout 148 can be used to extend the Default Layout 150.

As described above, Graph Frame 134 is a picture of a Frame Model 94. Graph Frame 134 draws a background box, gridlines, a top title, and a bottom title (footnote), and includes Axes 114, a Legend 112, and zero or more Elements 46.

Graph Frame 134 uses the dimensions created in Tree 98 of Frame Model 94 to create Axes 114. The number of Axes 114 created is based on the particular Coordinate System 138 that is installed for Graph Frame 134. Transformation 36 (shown in FIG. 1) must supply Graph Frame 134 with a Coordinate System 138 that is appropriate for the specific Transformation 36. The default Coordinate System 138 is Coordinate System 2D 140. Axes 114 are scaled using the POSITION dimensions obtained from Tree 98. Any number of Element 46 objects use the Axes 114 inside the frame to draw themselves. Element 46 objects may add non-positional dimensions to Graph Frame 134, which causes it to draw a Legend 112. Only one Legend 112 is drawn per Graph Frame 134.

Graph Frame 134 also has a background panel called a "bounding box." Aesthetics 38 of the bounding box is the "default Aesthetics" of a Graph Frame 134.

Graph Frame 134 also has both gridlines and two sets of titles for labeling. The gridlines have their own Aesthetics object 38 that can be used to change the appearance of the gridlines. One "title" appears at the top of Graph Frame 134, and the second "bottom title" appears at the bottom (like a footnote). The top title can be a String 44 (from FIG. 2) or an array of Text 166, or it can be set to Legend 112 for dragging and dropping different Element 46 objects between frames.

Within Graph Frame 134, Elements 46 draw a representation of the data. All Elements 46 operate independently of each other, and many different Elements 46 can be added to Graph Frame 134. Each Element 46 has its own Element Specification 96 (from FIG. 5) that is added to Frame Model 94. After Data View interface 14 processes Frame Model 94, Item Frame interface 18 (shown in FIG. 1) will contain the data for Elements 46—i.e., the geometry needed for drawing the elements. For example, Item Frame interface 18 for a bar chart based on means will contain only the means to be drawn. Item Frame interface 18 for a scatter plot will contain all the raw values for the scatter plot. Item Frame interface 18 for a smoother plot will contain all the x-y pairs for the smoother.

Depending on how Tree 98 is structured, Graph Frame 134 may create a Frame Element 136 for paneling. If the structure of Tree 98 requires more POSITION dimensions than Graph Frame 134 can handle, Graph Frame 134 will use a Frame Element 136 and pass it to Tree 98. Frame Element 136 will then examine Tree 98 to create and place appropriate "child" Graph Frames inside of the original Graph Frame 134. Each "child" Graph Frame will be given its own Tree 98, and the process may repeat. Elements 46 that are added to the parent Graph Frame 134 are "divided" like a biological cell—i.e., Element 46 divides into and contains n clones of itself—and each clone is placed into a Graph Frame 134.

The Glyph interface 32 (shown in FIG. 1) can cause a Transformation 36 to become "set" or "registered" with a Graph Frame 134. When registered with a Graph Frame 134, Transformation 36 affects the shape of the frame, the gridline, the axes 114 and the Elements 46. For example, a Polar Transformation, when registered on Graph Frame 134, would cause the graph to be round but would not affect the title or the Legend 112. A Similarity Transformation, when registered with the Graph Frame 134, would size or move the entire graph on the screen.

Anything that is drawn must implement the Glyph interface 32 (from FIG. 1). Glyphs draw or build themselves by creating Primitive Graph interface 34 objects within an instance of Renderer interface 152. Glyph interface 32 can then change the image by manipulating these objects. Calls to rebuild( ) cause these objects to be deleted and reconstructed, whereas calls to Renderer.refresh( ) update the screen image, reflecting any changes made by Glyph 32 to Primitive Graph interface 34 objects.

Individual Glyphs 32 are responsible for documenting when a rebuild( ) is required. Although Glyphs 32 can be set to any layer of Renderer interface 152 (layering determines drawing order), they can trace back their parent, or origin. For example, the parent of a Legend 112 would be a Graph Frame 134.

By default, Graph Frame 134 will take up the entire space in a Renderer interface 152. Thus, if no scaling Transformation 36 is registered with Graph Frame 134, the Graph Frame 134 will fill the entire window so that the Axes 114, Legends 112 and titles would not be visible. For that reason, a scaling Transformation 36—such as Affine Transformation 2D—that scales the Graph Frame 134 by something less than 1.0 should be registered with Graph Frame 134.

Graph Frame 134 is also a Mouse Listener. When Graph Frame 134 hears a Pointer Event 184 (shown in FIG. 12) from a Renderer interface 152 and discovers that the hit Primitive Graph interface 34 was part of any of the background, gridlines, or titles of Graph Frame 134, Graph Frame 134 will fire a Glyph Hit Event 194 to interested listeners, informing them that a frame has been hit.

Figure 12:
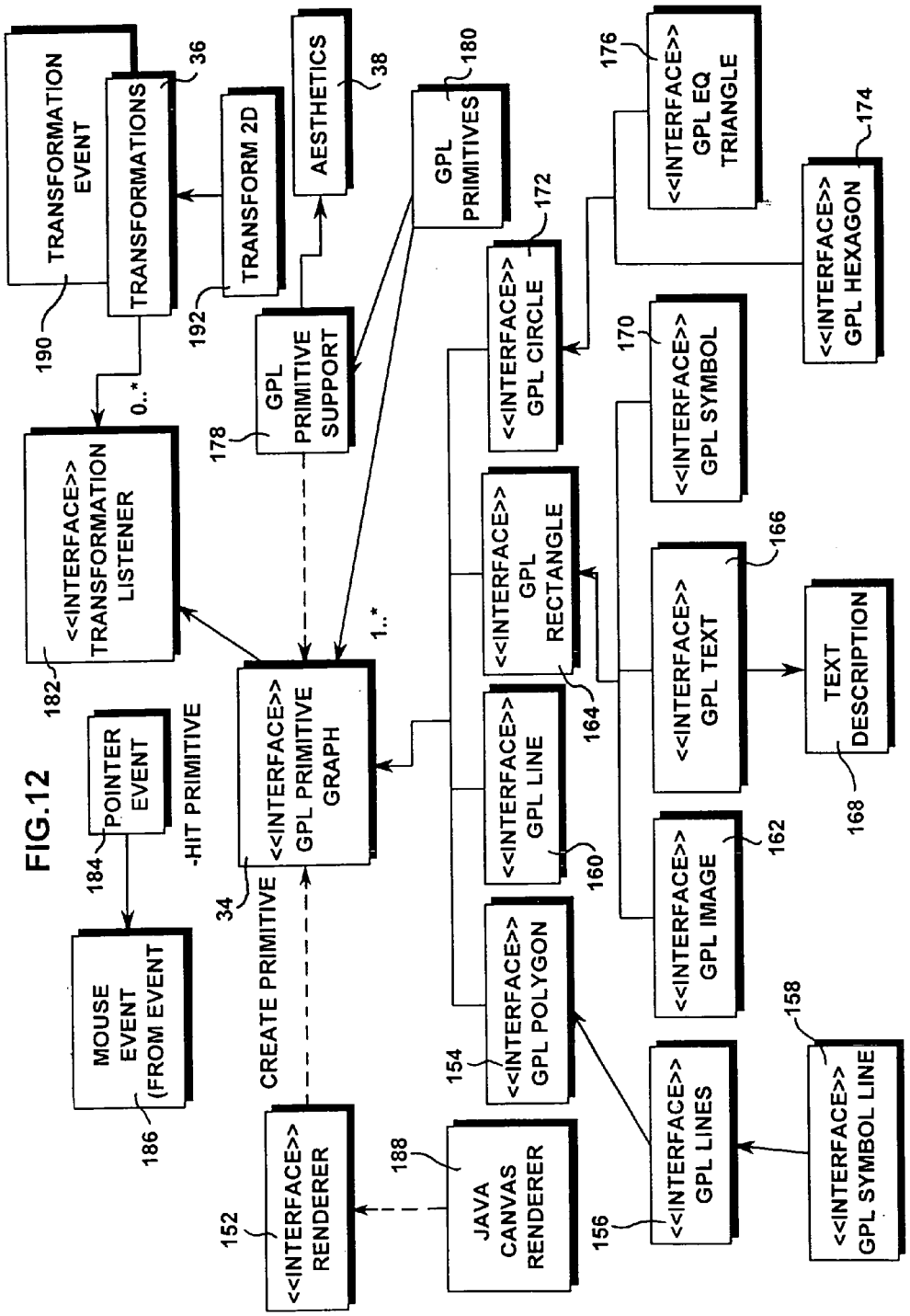
FIG. 12 is an object diagram of the Displayer of the present invention.

FIG. 12 is an object diagram of the displayer of the present invention. Renderer interface 152 is designed to be independent of the system's drawing tools. In the preferred embodiment, implementations of Renderer interface 152 will work with standard JDK 1.1 graphics, Java2D and Java3D. This independence is achieved by providing primitive graph drawing objects as interfaces; these include, for example, Polygon 154, Lines 156, Symbol Line 158, Line 160, Image 162, Rectangle 164, Text 166 of which Text Description 168 is a part, Symbol 170, Circle 172, Hexagon 174, Ellipse 175 (not shown), Slice 177 (not shown), Symbol line 179 (not shown), and Equilateral Triangle 176. Primitives are the basic drawing shapes in the GPL. Each concrete Renderer interface 152 must provide a Factory Method called createPrimitive( ) to instantiate a concrete primitive graph object (the object should come from an inner class). Renderer interface 152 lays a square Renderer.MIN to Renderer.MAX coordinate system on top of the system's drawing window. Values increase from left to right and from bottom to top. All coordinates for drawing will be on this scale. Renderer interface 152 also keeps track of the layering, which determines the drawing order. For instance, objects in layer two should appear "on top of" objects in layer one.

All drawing primitive graph interfaces extend from Primitive Graph interface 34 which contains method signatures for getting/setting the object's Aesthetics 38 (an object that describes the primitive's colors, styles, visibility and so on), layering, and handling transformations. Primitive Graph interface 34 extends the Associated Data interface 56 so that meta-data can be encoded into any drawing object. Primitive Support abstract class 178 is an implementation of Primitive Graph interface 34 that handles most of the required methods, but leaves Renderer-dependent methods as abstract. Also provided is a Primitives abstract class 180 which is a collection of Primitive Graph interfaces 34 that can be manipulated as one interface.

Primitive Graph interfaces 34 are the basic drawing shapes in the present invention. All drawing primitives should implement this interface. Primitive Graph interfaces 34 are required to maintain and/or provide: (a) their Aesthetics 38 object, (b) the layer in which Renderer interface 152 should draw them whether or not the Primitive Graph interfaces 34 are transformable, and (c) a constant as defined in the Primitive Graph interface 34 that describes their type. All Primitive Graph interfaces 34 are also Transformation Listener interfaces 182 and should know how to transform themselves when a Transformation 36 object instructs them to do so.

Primitive Support 178 provides a generic implementation of Primitive Graph Interface 34. Primitive Support 178 may be subclassed or used directly; it provides support for maintaining Aesthetics 38, whether or not Primitive Graph Interface 34 is transformable. Primitive Support 178 also provides support for transforming a basic primitive by telling the source transformation to transform "this" primitive.

Primitives abstract class 180 is a collection of Primitives all of which are treated as one Primitive Graph interface 34. For example, if a Circle interface 172 and Rectangle interface 164 are added to a Primitives abstract class 180, the Aesthetics 38 for both interfaces can be changed with one call to the Primitives.setAesthetics( ) method. The same idea applies to layers and Transformations 36. The primitives contained within this Primitives abstract class 180 can be clipped via setClip( ).

Whenever a Mouse Event 186 happens, Renderer interface 152 creates a Pointer Event 184 from the Mouse Event 186 and fires it to Mouse Listeners and Mouse Motion Listeners. If a Primitive Graph interface 34 were "hit", Pointer Event 184 would contain a reference to the Primitive Graph interface 34 that was hit. The difference between a Pointer Event 184 and a Mouse Event 186 is that the Pointer Event 184 contains a Coordinate object (not shown) that defines the event's location in terms of Renderer.MIN and Renderer.MAX. Pointer Event 184 can also contain a Primitive Graph interface 34 object, if one were hit.

Included in the displayer is one software component, Java Canvas Renderer 188. The Java Canvas Renderer 188 is an implementation of Renderer interface 152 using standard JDK 1.1 java.awt.Graphics on a java.awt.Canvas object.

Transformations 36, also shown in FIG. 12, use their respective mathematics to transform coordinates into other coordinates and directly modify—i.e., transform—Primitives abstract class 180. One class of Transformations 36 is Transform 2D 192. Primitive Graph interface 34 extends Transformation Listener interface 182, so all primitive objects are able to listen to transformation objects. Upon receiving a Transformation Event 190 via the transform( ) method, Primitives abstract class 180 gets the source of the event—which is the Transformation 36 object that fired the event—and uses it to transform itself. The Primitive Support abstract class 178 handles an implementation of this, and the client controls whether or not a Primitives abstract class 180 is "transformed." All Primitives abstract classes 180 can setTranformable( ) to true or false. A Primitives abstract 180 object marked "transformable" may have an entirely different appearance after a Transformation 36, whereas Primitive objects that are not transformable may have only their position changed. For instance, a Rectangle interface 164 that is not transformable would have its center coordinate transformed but would remain a rectangle. By contrast, a Rectangle interface 164 that is transformable may end up not looking like a rectangle.

Transformations 36 also provide empty Coordinate objects that correspond to the coordinate system of the actual Transformation 36 which has the correct number of dimensions. For example, a Polar Transformation provides Coordinates that can handle two values (r and theta), while a Spherical Transformation provides Coordinates with three values(r, phi, and theta). Math class—a class consisting of static final methods that do math on an array of doubles using functions such as cosine, log, sin, and square root.

Transformations 36 work by firing Transformation Events 190 to interested Primitives abstract class 180. The listeners then take action to get the Transformation 36 that is the source of the event to operate on them. As used here, the event model accommodates Transformations 36 that may rely on mouse movements (such as Fish Eye Transformation) or some UI tool that causes changes in Transformation 36 to happen.

Figure 13:
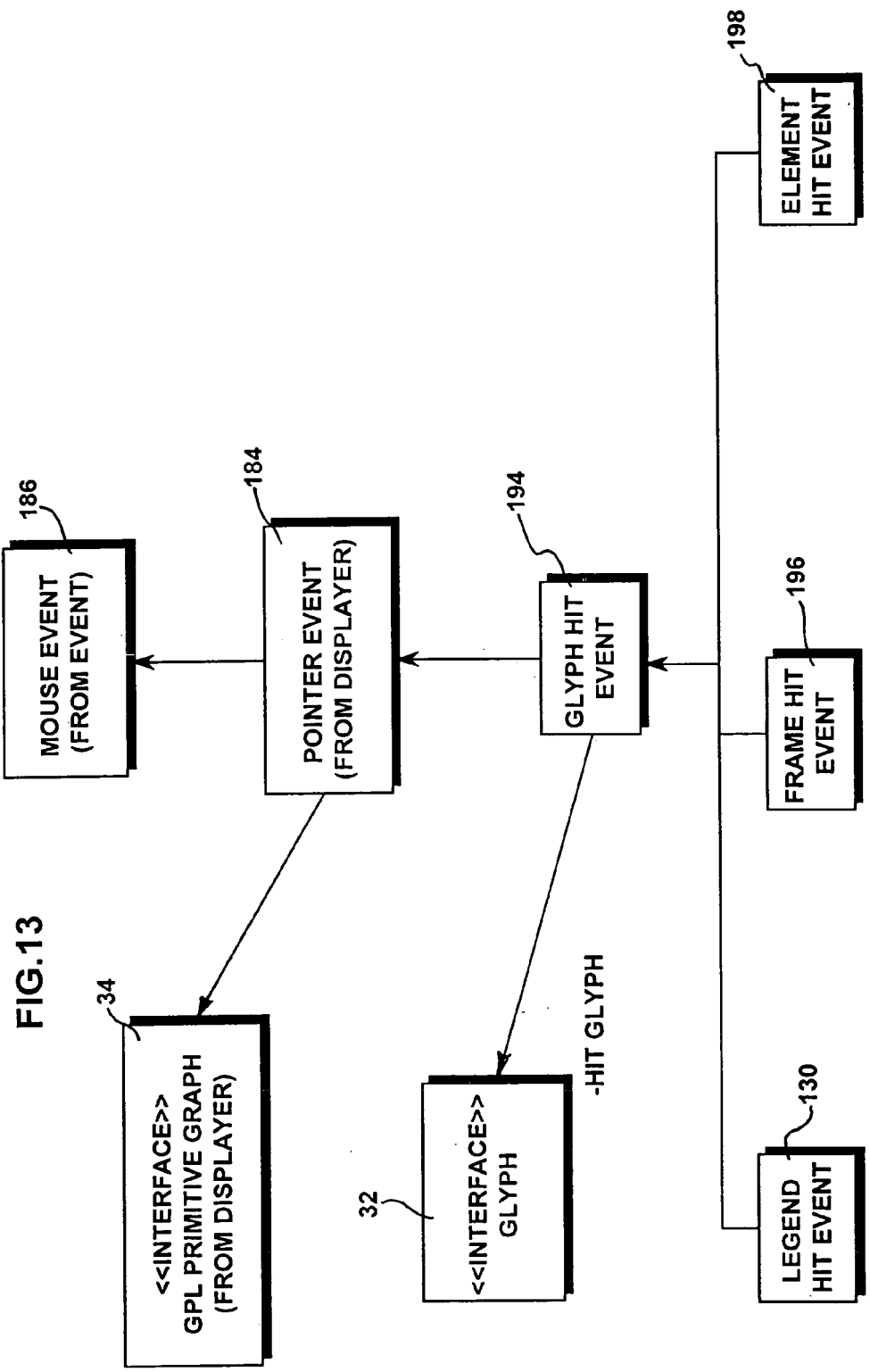
FIG. 13 is an object diagram depicting the software interactions which occur when the user selects an item.

FIG. 13 is an object diagram depicting the software interactions that occur when the user selects an item. User actions are handled via different events, including any of the following: Mouse Event 186, Pointer Event 184, Glyph Hit Event 194, or any of the subclasses of Glyph Hit Event 194—i.e., Legend Hit Event 130, Frame Hit Event 196, or Element Hit Event 198.

At a lower level, concrete Renderer interface 152 (shown in FIG. 12) speaks the system's language of rendering and detecting hits. It determines which geometric object—e.g., Circle 172 and Rectangle 164 (both from FIG. 12)—was "hit" and, in response, fires a Pointer Event 184, a subclass of Mouse Event 186. Element 46 (from FIG. 2), Graph Frame 134 (from FIG. 11), Axis 114 (from FIG. 10), and Legend 112 (from FIG. 10) all listen for Pointer Event 184 to determine if their geometric shape was hit. If their respective geometric shape was hit, they fire an instance of Glyph Hit Event 194 that contains the graphics object—or Glyph interface 32 (such as Point, Legend 112 and the like) that was hit. Controllers (see FIGS. 14 and 15) or any other listeners listen for Glyph Hit Events 194 and take whatever action the particular Controller was designed to do by operating directly on Graph Frame 134. Pointer Event 184 may also fire an instance of Primitive Graph interface 34.

Figure 4:
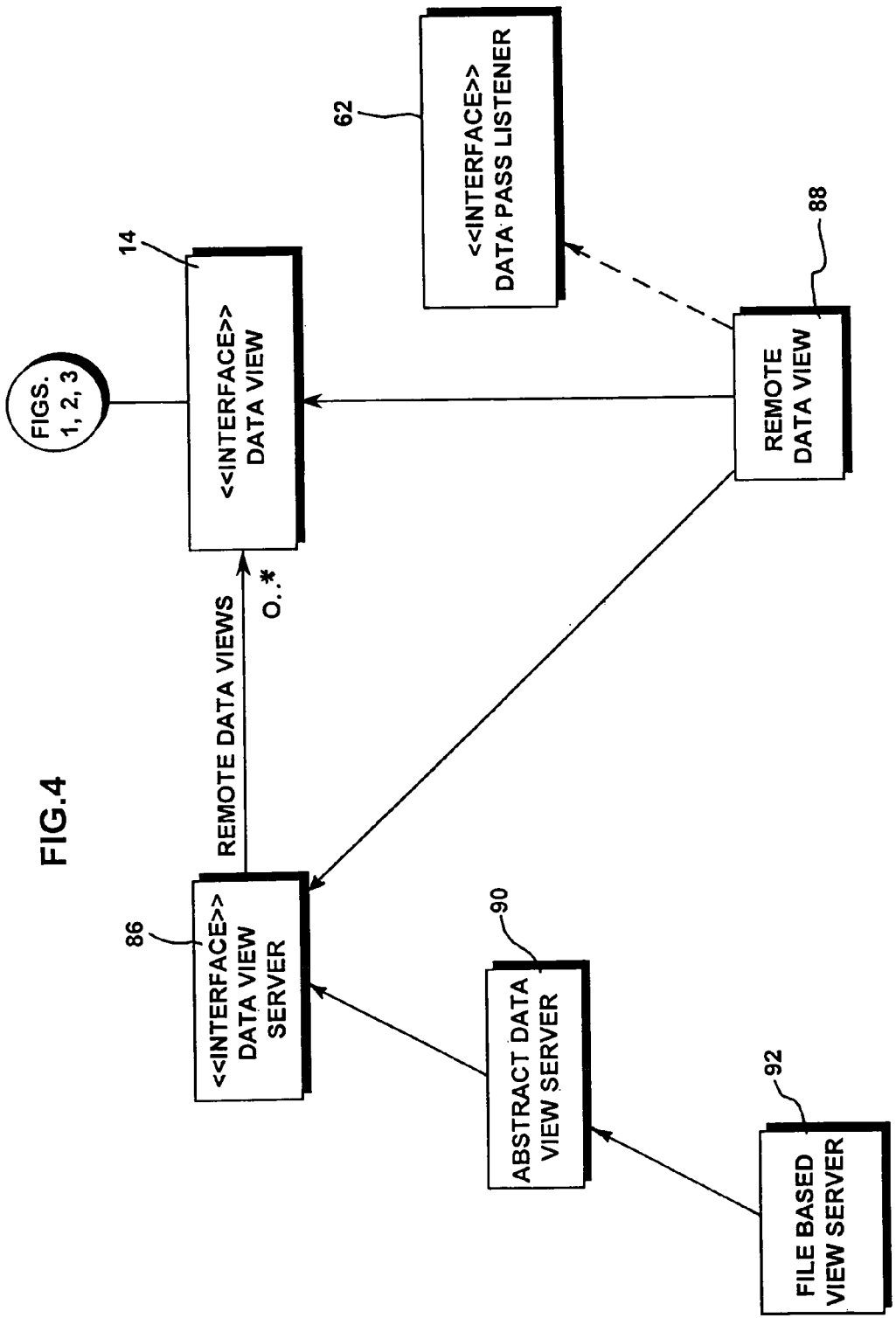
FIG. 4 is an object diagram of the Server aspect of the present invention.

FIG. 4 shows the program server. This figure applies where the inventive method and system are utilized over a typical client-server network. The Data View Server interface 86, shown in FIG. 4, distributes the data access/manipulation for creating graphs. The Data View interface 14 extends java.rmi.Remote, so all Data View Objects can be distributed. There is one concrete Data View interface 14 on the Data View Server interface 86 for every client connected to the server. The Data View Server interface 86 manages the individual, remote Data View interfaces 14 by activating/passivating them and sharing information that is the same between Data View Interfaces 14. The client's program must use a Remote Data View 88 object as its Data View Interface 14.

Remote Data View 88 performs all the necessary communication with the Data View Server interface 86, and Remote Data View 88 is also a Data Pass Listener 62 (from FIG. 3) to receive call-back notifications when the data pass on the remote object is complete. The communication happens as follows:

A client calls dataview.beginDataPass( ) on the client-side Remote Data View 88.

Remote Data View 88 asks for a handle to its Data View interface 14 from the server.

The server wakes up the correct Data View interface 14 and returns a handle to it.

Remote Data View 88 registers itself with this Data View interface 14 as a Data Pass Listener interface 62 if not already registered.

Remote Data View 88 calls dataview.beginDataPass( ) on the server-side Data View interface 14.

The server-side Data View interface 14 calls aboutToDataPass( ).

This is received by Remote Data View 88 and forwarded to its listeners on the client-side.

Any calls from Remote Data View 88 client-side Data Pass Listener interface 62 are forwarded to the server-side Data View interface 14.

The data pass happens (on the server-side).

The server-side Data View interface 14 calls finishedDataPass( ).

This is received by Remote Data View 88 on the client-side and forwarded to listeners.

If a set amount of milliseconds goes by without interruption, Remote Data View 88 asks Data View Server interface 86 to passify the server-side Data View interface 14.

Abstract Data View Server 90 provides an implementation of Data View Server interface 86 but leaves the actual writing and reading for activation/passivation to subclasses. File Based Data View Server 92 reads and writes to files on disk.

Figure 14:
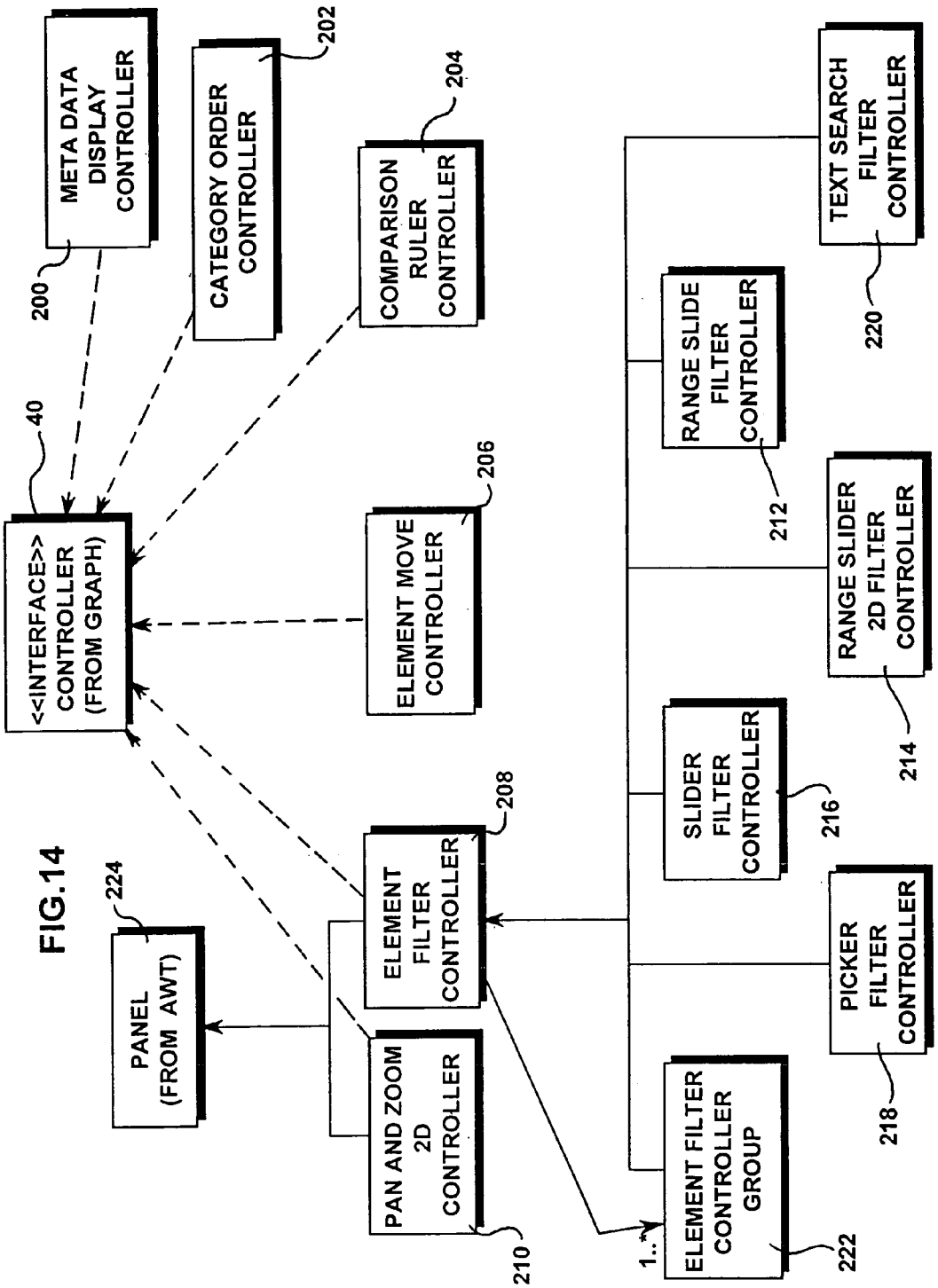
FIG. 14 is an object diagram showing the Controller interface and the controllers which operate through the Controller interface.

FIG. 14 depicts Controller interface 40 and the various controllers that work through Controller interface 40. The implementing interfaces of Controller interface 40 are the Meta-Data Display Controller 200, Category Order Controller 202, Comparison Ruler Controller 204, Element Move Controller 206, Element Filter Controller 208 (which is an abstract class), and Pan and Zoom 2D Controller 210.

Meta-Data Display Controller 200 displays meta-data obtained from an Element 46 (from FIG. 2), a Legend label, or a Legend tick label.

Category Order Controller 202 controls the order in which categories are displayed. Comparison Ruler Controller 204 uses meta-data to warn end users of invalid comparisons in a Graph 10. Element Move Controller 206 moves Elements 46 between frames in a paneled Graph 10. Abstract class Element Filter Controller 208 controls whether or not individual cases (rows) are included in a Graph 10. Cases not included in a graph are not visible and not involved in any functions that an Element 46 may use.

Five different types of filters are available: Range Slider Filter Controller 212, Range Slider 2D Filter Controller 214, Slider Filter Controller 216, Picker Filter Controller 218, and Text Search Filter Controller 220. Any of these five filters can be inserted into the Element Filter Controller Group 222, which acts as a single filter.

Slider Filter Controller 216 filters a single point of Data 12 and shows only the selected data point. Picker Filter Controller 218 works only with entire categories of Variable Set 22. Selecting/de-selecting a categorical variable through Picker Filter Controller 218 causes the entire category to be filtered or not filtered. Range Slider Filter Controller 212 filters a range of data and only the data within the selected range are shown; inversely, all data not in the selected range may be shown. Range Slider 2D Filter Controller 214 filters a range of data in two dimensions simultaneously.

Pan and Zoom 2D Controller 210 is a graph navigation tool. It allows a user to "pan" or "zoom" in a graph. Pan and Zoom 2D Controller 210 and Element Filter Controller 208 are subclasses of Panel 224.

Figure 15:
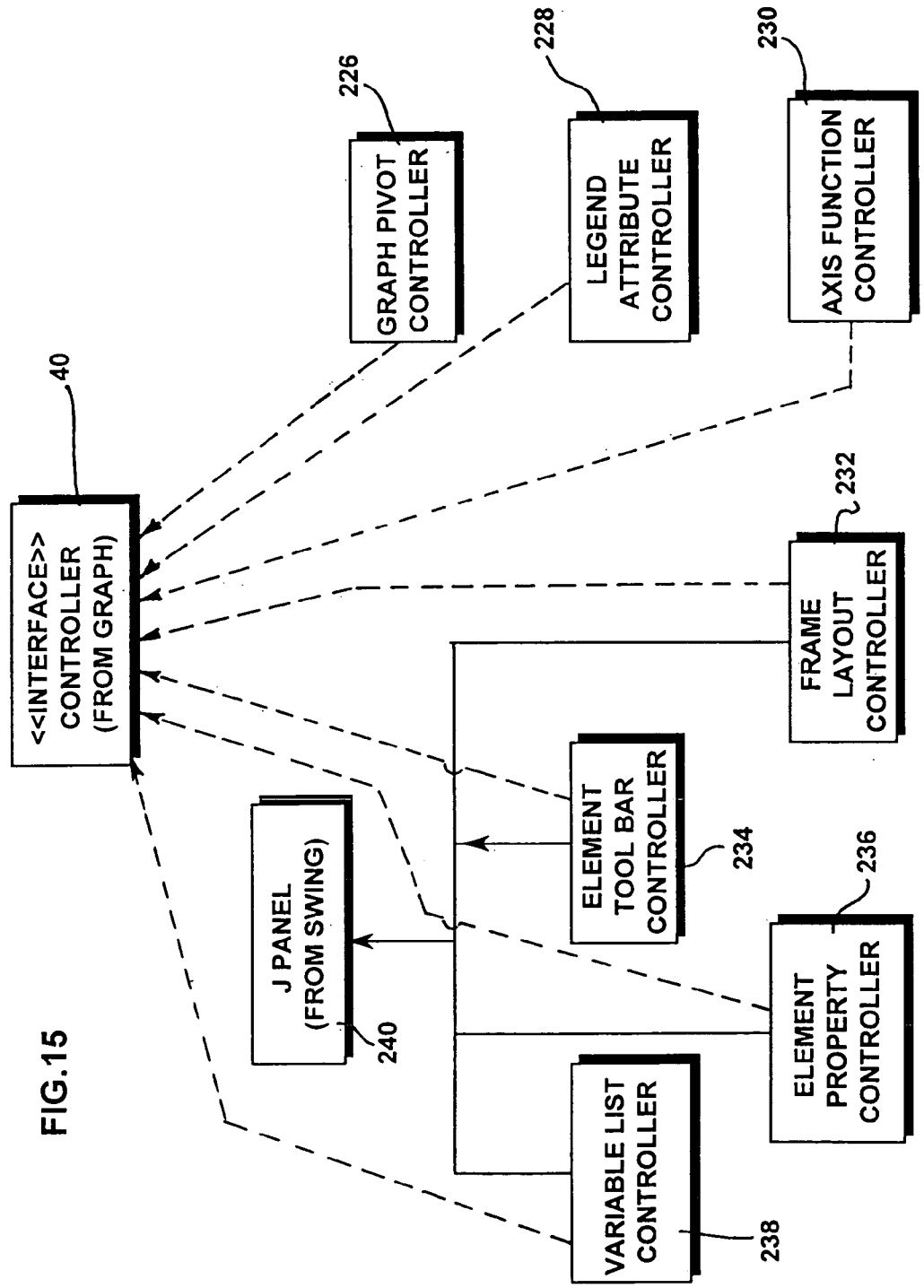
FIG. 15 is an object diagram of the builder controllers.

FIG. 15 shows the relationship between the Controller interface 40 and the builder controllers. Builder controllers are modules used to construct a UI for creating graphs. The builder controllers are implementing interfaces of the Controller interface 40 and include the Graph Pivot Controller 226, Legend Attribute Controller 228, Axis Function Controller 230, Frame Layout Controller 232, Element Tool Bar Controller 234, Element Property Controller 236, and Variable List Controller 238. The last four of these—i.e., Frame Layout Controller 232, Element Tool Bar Controller 234, Element Property Controller 236, and Variable List Controller 238—are subclasses of JPanel 240.

Graph Pivot Controller 226 provides pivot capabilities for graphs. Axes 114 (from FIG. 10) can be pivoted with one another by dragging a Variable Set 22 (from FIG. 1) from one Axis 114 to another. Legend Attribute Controller 228 provides direct control over mapping attributes to data.

Axis Function Controller 230 provides control over the function used on a particular Axis 114. The functions are obtained via reflection from the gpl.dataview. Functions can be added or removed from the pop-up list via the setFunctions indexed property. Axis Function Controller 230 listens to Graph 10 (from FIG. 1) or Graph Frame 134 (from FIG. 11) for Legend Hit Events 130 (from FIG. 10). Axis Function Controller 230 simply changes the Frame Layout interface 42 (from FIG. 2) object to a specified layout.

Frame Layout Controller 232 provides control over the Graph Frame 134 or the Graph 10 layout. Frame Layout Controller 232 listens to actual Graph 10 or Graph Frames 134 for Property Change events.

Element Tool Bar Controller 234 provides control over Elements 46 that are included in Graph 10 or Graph Frame 134. Elements 46 can be removed from the graph by clicking on the Element 46 and dragging it back to an Element Tool Bar. Different Elements 46 can be added and removed from the Element Tool Bar via the Elements indexed property. Element Tool Bar Controller 234 listens to Graphs 10 and Graph Frames 134 for property Change events (not shown), Frame Hit Events 196 (from FIG. 13), and to actual Graphs 10 or Elements 46 for Element Hit Events 198 (from FIG. 13).

Element Property Controller 236 provides control over the properties of a particular Element 46. The editable properties of Element 46 are displayed in a table and can be modified by the user. Element Property Controller 236 listens for data Change events from Data View interface 14, Element Hit Events 198 from Graphs 10 or Elements 46, and property Change events from Graphs 10 or Graph Frames 134.

Variable List Controller 238 provides control over which variables 22 are displayed in a graph. Variables 22 can be removed from a graph. Variable List Controller 238 listens to data Change events from Data View interface 14, and legend Label Released, legend Released, and property Change events (not shown) from Graph Frame 134 or Graph 10.

Figure 16:
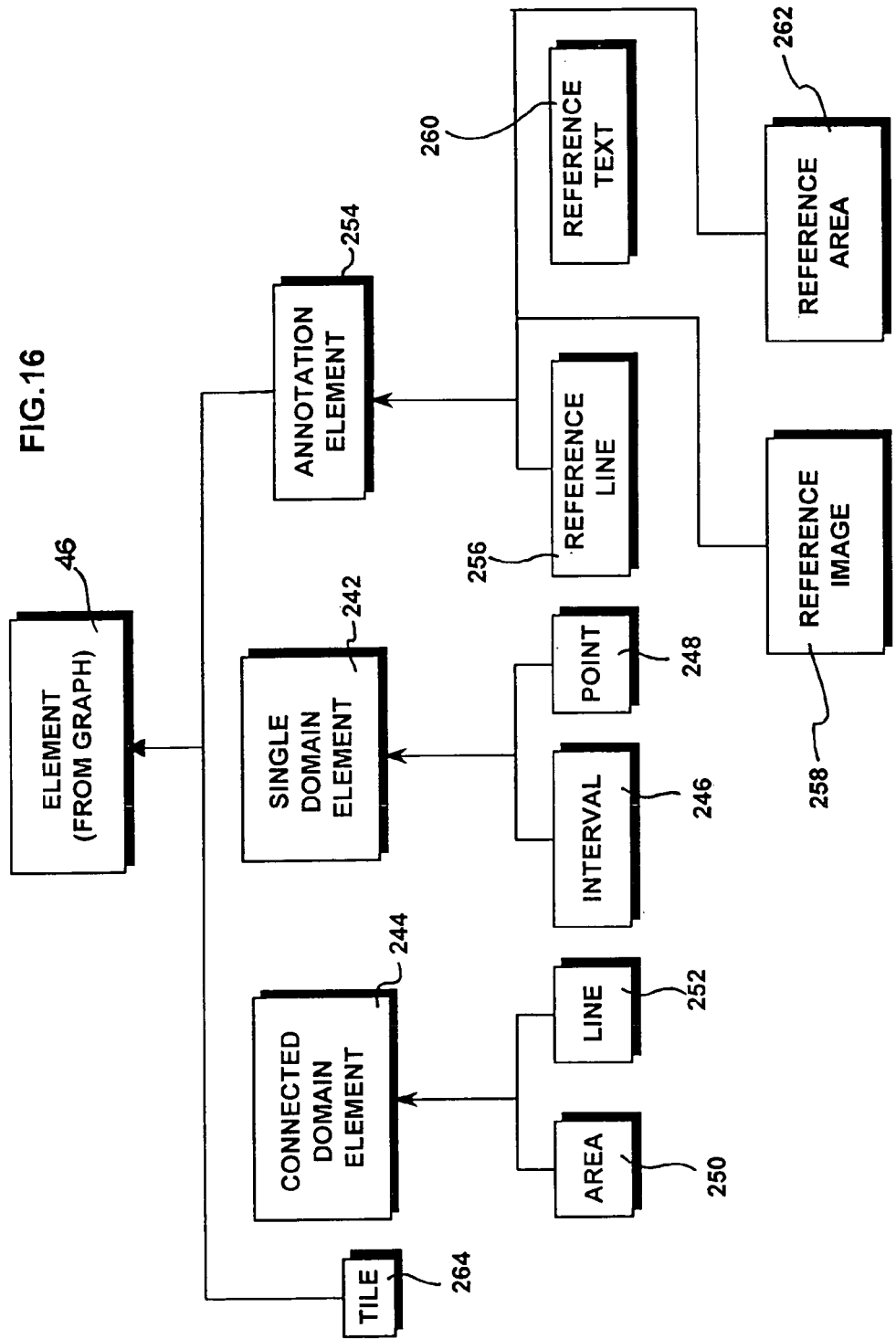
FIG. 16 is an object diagram of the Elements package of the present invention.

FIG. 16 is an object diagram of the Elements Package of the present invention. The Elements Package contains the actual elements (subclasses of Element 46) for drawing Graph 10.

There are two major classes of Elements 46: Single Domain Elements 242 and Connected Domain Elements 244. The difference between them is how the data are fed to subclasses Interval 246 and Point 248 of Single Domain Element 242 and subclasses Area 250 and Line 252 of Connected Domain Element 244. Single Domain Elements 242 draw a single picture for each value in each domain, and they are fed only the data for the domain that is being drawn. By contrast, Connected Domain Elements 244 draw between values over the entire domain, so they are fed all the data for a particular domain. Of Connected Domain Elements 244, subclass Area 250 fills an area for the results of a function connected across the domain; subclass Line 252 draws a line for the results of a function connected across the domain. Of Single Domain Element 242, subclass Interval 246 draws a shape between two or more coordinates, the shape of the Interval depending on the value of the Aesthetics shape parameter defined by the constraints in Point; Point 248 draws a single point for each coordinate, the shape of the point depending on the value of the Aesthetics shape parameters which are defined by constraints comprising character, dot, h-dash, hexagon, image, plus, rectangle, spread, triangle, and v-dash.

Annotation Elements 254 are also provided. Annotation Elements 254 are for reference and are not based on data from Data View interface 14. They can all be placed in a Graph Frame 134 (from FIG. 11) using data coordinates or coordinates (−1 to 1) from Renderer interface 152 (shown in FIG. 12). The subclasses of Annotation Element 254 are Reference Line 256, Reference Image 258, Reference Text 260 and Reference Area 262, all of which are used to annotate a Graph 10.

The final subclass of Element 46 is Tile 264.

Figure 19:
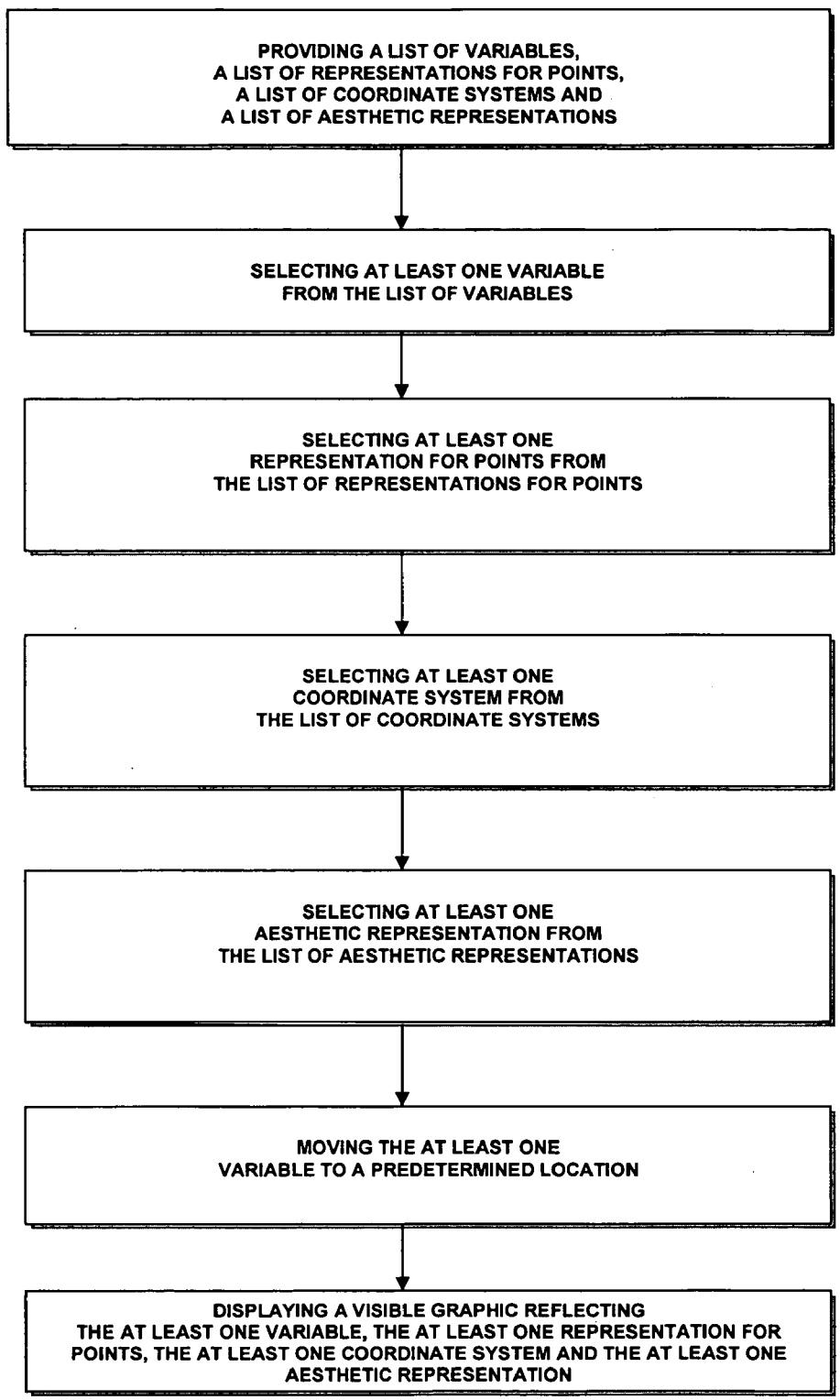
FIG. 19 is a flowchart illustrating schematically an alternate method of forming graphics from data in accordance with the present invention.

Another embodiment of the invention is a method for creating quantitative aesthetic graphics from data as shown in FIG. 19. This embodiment utilizes the software components of the inventive system, as described above. The method comprises providing a list of variables. The Data View interface 14 provides such a list. Data 12, after being indexed, are converted first to Variable Data Structures, and then to Variable Sets 22 by application of Algebra 24 involving the use of at least one function of nest, blend, and cross, as described above.

The variables are as previously described and may be continuous, or alternatively categorical. When the variables are categorical, the numeric scale is an integer ranging from zero to a value that is one less than the number of categories. When the variables are continuous, the numeric scale runs from the minimum value for the data to the maximum value. Data View interface 14 processes specifications contained in the Frame Model 94 that must be performed to draw the Elements 46 in a graph. Included among the specifications are Scaling Specification 48 (from FIG. 2), Element Specification 96 (from FIG. 5), Variable Transformation Specification 52 (from FIG. 2), and Coordinate Specification 50 (from FIG. 2), discussed above.

The next step is providing a list of representations for points. Such representations may comprise any of the attributes, described above, defined by the type of Graph Dimension 100, as discussed above. For example, the representations may include those such as position, size, shape, color, hue, brightness, saturation, rotation, blur, transparency, texture, pattern, orientation, or granularity, for example. As described above and in accordance with the invention, Glyph 32 uses a graphing function to produce a Primitive Graph 34 from the variables and relates the variables to dimensions of a geometric space in which the graph will be imbedded.

Another step of the inventive method is providing a list of coordinate points, based upon a coordinate system, as previously described. Any suitable coordinate system may be used, including, for example, Cartesian, rectangular, polar, spherical, or other system. The particular Coordinate System 138 that is installed for Graph Frame 134 determines the number of Axes 114 created.

The method also comprises providing a list of aesthetic representations. The Aesthetics class 38 holds all aesthetic attributes for drawing a Primitive Graph 34. These attributes may be visual or, alternatively, non-visual, such as sound, for example.

Additional steps of the inventive method include selecting at least one variable from the list of variables, selecting at least one representation for points from the list of representation for points, selecting at least one coordinate system from the list of coordinate systems, and selecting at least one aesthetic representation from the list of aesthetic representations.

After the above selections have been made, the next steps to the inventive method involve moving the at least one variable to a predetermined location and displaying a visible graphic that reflects the at least one variable, the at least one representation for points, the at least one coordinate system, and the at least one aesthetic representation. Graph Frame 134 draws a background box, gridlines, a top title, bottom title and include Axes 114, a Legend 112, and Elements 46. Item Frame interface 18 contains the geometry needed for drawing the elements. Transformation 36 locates a point in space, given its coordinate system. Using their respective mathematics, Transformation 36 transforms coordinates into other coordinates and directly modify—i.e., transform— Primitives abstract class 180, as described above. In so doing, Transformation 36 transforms Primitive Graph 34 and represents it in the selected coordinate system. Transformations 36 are limited to transformations that maintain the functional relationship between the domain and the range of a particular Primitive Graph 34. Preferably, the Transformation 36 is registered with the Graph Frame 134. Renderer interface 152 (from FIG. 12) applies Aesthetics 38 when the primitive graph is drawn. Primitive Graph drawing objects are provided; shown in FIG. 12, these include, for example, Polygon 154, Lines 156, Symbol Line 158, Line 160, Image 162, Rectangle 164, Text 166 of which Text Description 168 is a part, Symbol 170, Circle 172, Hexagon 174, Ellipse 175 (not shown), Slice 177 (not shown), Symbol line 179 (not shown), and other Primitives 181 (not shown). In the graphical representation, the set of points may be represented by an interval, point, area, or line, for example.

In yet another embodiment in accordance with the invention, a data processing system is provided for constructing graphs mathematically from data and aesthetically representing the graphs as graphics. The system comprises a computer processor and a memory coupled to the computer processing. The memory contains a set of computer instructions for:

(a) indexing Data 12 to form a Data Set 16;

(b) converting the data set into a Variable Data Structure, defined as follows:

varset[$X_1, ..., X_n$] = {[$l_m, X_1, ..., X_n, f$]}, where
$X_1, ..., X_n$ represents n sets and is a finite set or a
set of real numbers or tagged real numbers,
l is an index set {1, 2, ..., m},
m ranges over all the natural numbers N,
f: $l \rightarrow X_1 \times X_2 \times ...X_n$, and f ranges over all
such possible functions;

(c) converting the Variable Data Structure into a Variable Set 22 of the form V=varset[X], using at least one of a blend function, a cross function, and a nest function;

(d) mapping the Variable Set 22 into a set of mathematical points; and (e) mapping the set of mathematical points into an aesthetic representation.

The memory may also contain instructions for implementing the various functions and interfaces described above.

Another embodiment in accordance with the invention is a non-volatile storage medium containing computer software encoded in a machine readable format for creating quantitative graphics. The non-volatile storage medium includes: a set of computer instructions for indexing data to form a data set; a set of computer instructions for converting the data set into a variable data structure, where the variable data structure has an index set, a range and a function; a set of computer instructions for converting the variable data structure into a variable set by using at least one function selected from the group consisting of a blend function, a cross function, and a nest function; a set of computer instructions for mapping the variable set into a set of points; and a set of computer instructions for mapping the set of points into an aesthetic representation. Additionally, the non-volatile storage medium may include a set of instructions relating the variables to dimensions of a geometric space in which the aesthetic representation will be imbedded.

The features, functions, and events described above are similarly incorporated into this embodiment.

Figure 17:
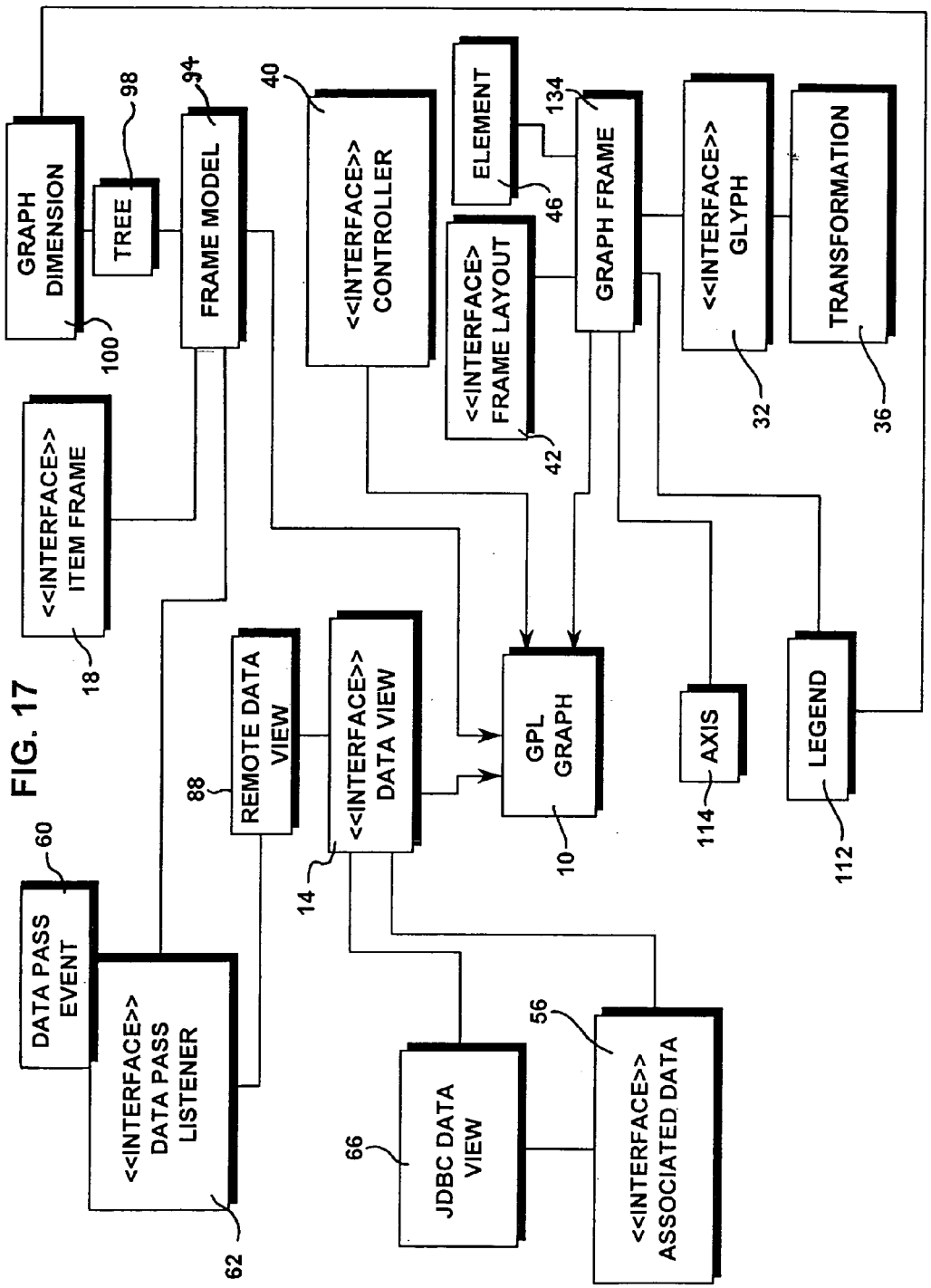
FIG. 17 is an object diagram showing the interrelationship among the Data View Package, the Frame Model, the Controller, and the Graph Frame.

FIG. 17 is an object diagram showing the interrelationship among the following software components, previously discussed:

(a) the Data View interface 14 (shown in FIG. 3) including Remote Data View 88 (shown in FIG. 4) and JDBC Data View 66 (shown in FIG. 3);

(b) the Item Frame interface 18 (shown in FIG. 1), including Frame Model 94 (shown in FIG. 5) comprising Tree 98 and Graph Dimensions 100 (both shown in FIG. 5);

(c) the Controller interface 40 (shown in FIGS. 14 and 15); and (d) the Frame Layout interface 42, including Graph Frame 134, Legend 112, Axes 114, and Glyph interface 32 (all of which are shown in FIG. 11).

The embodiments of the invention described above are intended to be illustrative only and should not be considered to limit the invention as set forth in the following claims. It will be understood that the invention is capable of numerous changes, modifications and rearrangements and such changes, modifications and rearrangements are intended to be within the scope of the following claims.

Claim elements and steps herein have been numbered and/or lettered solely as an aid in readability and understanding. As such, the numbering and/or lettering in itself is not intended to and should not be taken to indicate the ordering of elements and/or steps in the claims.

I claim:

1. A method for creating with a computer quantitative aesthetic graphics from a variable data structure composed of an index set, a range and a function comprising:
    converting the variable data structure into a variable set by using at least one of a blend step, a cross step, and a nest step;
    mapping the variable set into a set of points; and
    mapping the set of points into an aesthetic representation.

2. The method of claim 1 wherein the variable set comprises a range of values selected from the group consisting of numerical values and non-numerical values.

3. The method of claim 1 wherein the blend step results in a union in the range of the variable data structure.

4. The method of claim 1 wherein the cross step results in a cartesian product in the range of the variable data structure.

5. The method of claim 1 wherein the nest step results in stratifying the values of the sets.

6. The method of claim 1 wherein the step of mapping the variable set into a set of points involves relating the variable set to the dimensions of a graphic space in which the aesthetic representation will be imbedded.

7. The method of claim 1 wherein the step of mapping the set of points into an aesthetic representation involves mapping the set of points to strings or real numbers that serve as input to a physical display device.

8. The method of claim 1 wherein the mapping the set of points comprises selecting a coordinate system from the group consisting of cartesian, rectangular, polar, two-dimensional, three-dimensional, and spherical systems.

9. The method of claim 1 wherein the step of mapping the variable set comprises representing the variable set by one representation selected from the group consisting of an interval, a point, a line, or an area.

10. The method of claim 1 wherein the step of mapping the set of points comprises mapping the variable set to at least one graph dimension selected from the group consisting of visual and non-visual attributes.

11. The method of claim 10 wherein the visual attribute is selected from the group consisting of position, size, shape, color, hue, brightness, saturation, motion, rotation, blur, transparency, texture, pattern, orientation, or granularity.

12. A data processing system for constructing graphs mathematically from a variable data structure and aesthetically representing the graphs as graphics comprising:
    a computer processor; and
    a memory responsively coupled to the computer processor containing a set of computer instructions for:
        (a) converting a variable data structure comprising an index set, a range and a function into a variable set by using at least one of a blend function, a cross function, and a nest function;
        (b) mapping the variable set into a set of mathematical points; and
        (c) mapping the set of mathematical points into an aesthetic representation.

13. The system of claim 12 wherein in said computer instructions, the variable data structure is a set comprising values selected from the group consisting of finite numbers and real numbers.

14. A non-volatile storage medium containing computer software encoded in a machine readable format for creating quantitative aesthetic graphics from data comprising:
    a. a set of computer instructions for converting a variable data structure comprising an index set, a range and a function into a variable set by using at least one of a blend step, a cross step and a nest step;

b. a set of computer instructions for mapping the variable set into a set of points; and c. a set of computer instructions for mapping the set of points into an aesthetic representation.

15. The system of claim 14 wherein in said computer instructions, the variable data structure has a range selected from the group consisting of numerical and non-numerical values.

16. The system of claim 14 wherein the computer instructions for mapping the set of points into an aesthetic representation comprise mapping the points in a predetermined coordinate system.

17. The system of claim 15 wherein the computer instructions further comprise mapping the set of points to at least one dimension selected from the group consisting of visual and non-visual attributes.

18. The system of claim 14 further including a set of computer instructions for prompting for which operation to perform.

19. The system of claim 14 wherein said computer instructions define a layout for creating the aesthetic graphics.

20. The method of claim 1 wherein the function is represented by f and the variable data structure is defined as follows:

varset$[X_1, \ldots, X_n]=\{[I_m, X_1, \ldots, X_n, f]\}$, where $X_1, \ldots, X_n$ represents n sets, I is an index set $\{1, 2, \ldots, m\}$, m ranges over all the natural numbers N, f: $I \to X_1 \times X_2 \times \ldots X_n$, and f ranges over all such possible functions.

21. The method of claim 20 wherein the function operates on an index set to produce an index set.

* * * * *